United States Patent
Hellestrand et al.

(12) 
(10) Patent No.: US 6,230,114 B1
(45) Date of Patent: May 8, 2001

(54) HARDWARE AND SOFTWARE CO-SIMULATION INCLUDING EXECUTING AN ANALYZED USER PROGRAM

(75) Inventors: Graham R. Hellestrand, Foster City, CA (US); Ricky L. K. Chan, East Lindfield (AU); Ming Chi Kam, Kingsford (AU); James R. Torossian, Whale Beach (AU)

(73) Assignee: Vast Systems Technology Corporation, Sunnyvale, CA (US)

( * ) Notice: Subject to any disclaimer, the term of this patent is extended or adjusted under 35 U.S.C. 154(b) by 0 days.

(21) Appl. No.: 09/430,855

(22) Filed: Oct. 29, 1999

(51) Int. Cl.$^7$ ................ G06F 17/50; G06F 9/455

(52) U.S. Cl. ............... 703/13; 703/16; 703/17; 703/23; 714/28

(58) Field of Search .................. 703/6, 15, 16, 703/17, 14, 21, 23, 26, 28; 710/7; 712/223, 226, 227; 717/2, 4, 5, 35, 38; 714/28, 33

(56) References Cited

U.S. PATENT DOCUMENTS

| | | | |
|---|---|---|---|
| 5,025,364 | 6/1991 | Zellmer | 364/200 |
| 5,493,508 | 2/1996 | Dangelo et al. | 364/489 |
| 5,493,672 | 2/1996 | Lau et al. | 395/500 |
| 5,515,525 | 5/1996 | Grynberg et al. | 395/500 |
| 5,546,562 * | 8/1996 | Patel | 395/500 |
| 5,590,049 | 12/1996 | Arora | 364/489 |
| 5,600,579 | 2/1997 | Barnstijn et al. | 395/183.14 |
| 5,600,790 | 2/1997 | Barnstijn et al. | 395/183.14 |
| 5,623,418 | 4/1997 | Rostoker et al. | 364/489 |
| 5,663,900 | 9/1997 | Bhandari et al. | 364/578 |
| 5,664,098 | 9/1997 | Bianchi et al. | 395/186 |
| 5,673,418 | 9/1997 | Stonier et al. | 395/500 |
| 5,675,771 | 10/1997 | Curley et al. | 395/500 |
| 5,678,028 | 10/1997 | Bershteyn et al. | 395/500 |
| 5,768,567 | 6/1998 | Klein et al. | 395/500 |
| 5,771,370 | 6/1998 | Klein | 395/599 |
| 5,787,245 | 7/1998 | You et al. | 395/183.14 |
| 5,801,958 | 9/1998 | Dangelo et al. | 364/489 |
| 5,809,450 | 9/1998 | Chrysos et al. | 702/186 |
| 5,812,431 | 9/1998 | Kundert | 364/578 |
| 5,815,715 | 9/1998 | Kucukcakar | 395/705 |

(List continued on next page.)

FOREIGN PATENT DOCUMENTS

| | | |
|---|---|---|
| WO 9526000 | 9/1995 | (WO). |
| WO 9857283 | 12/1998 | (WO). |
| WO 99021085 | 4/1999 | (WO). |

OTHER PUBLICATIONS

Lisa Guerra et al. 'Cycle and Phase Accurate DSP Modeling and Integration for HW/SW Co–Verification', ACM 1–581113–092, 36th Design Automation Conference (ACM) New Orleans, 1999, pp. 964–969.*

Karam Chatha and Ranga Vermuri, 'Performance Evaluation Tool for Rapid Prototyping of Hardware–Software Codesigns', IEEE 0–8186–8479–8/98, pp. 218–224.*

Paulin, Frehel, Harrand Berrebi, Liem, Nacabal and Herluison, 'High–Level Synthesis and Codesign Methods: An Application to a Videophone Codec', IEEE 0–8186–7156–4/95, pp. 444–451.*

(List continued on next page.)

Primary Examiner—Kevin J. Teska
Assistant Examiner—Lonnie A. Knox
(74) Attorney, Agent, or Firm—Dov Rosenfeld; Inventek

(57) ABSTRACT

A co-simulation design system that runs on a host computer system is described that includes a hardware simulator and a processor simulator coupled via a interface mechanism. The execution of a user program is simulated by executing an analyzed version of the user program on the host computer system. The analysis adds timing information to the user program so that the processor simulator provides accurate timing information whenever the processor simulator interacts with the hardware simulator.

71 Claims, 12 Drawing Sheets

U.S. PATENT DOCUMENTS

| | | | |
|---|---|---|---|
| 5,819,065 | 10/1998 | Chilton et al. ..................... | 395/500 |
| 5,838,948 | 11/1998 | Bunza ................................ | 395/500 |
| 5,848,236 | 12/1998 | Dearth et al. ................. | 395/183.09 |
| 5,848,270 | 12/1998 | DeLuca et al. ..................... | 395/675 |
| 5,857,091 | 1/1999 | Fernandes et al. ................. | 395/500 |
| 5,862,361 | 1/1999 | Jain ................................... | 395/400 |
| 5,867,399 | 2/1999 | Rostoker et al. ................... | 364/489 |
| 5,867,400 | 2/1999 | El-Ghoroury et al. ............. | 364/490 |
| 5,870,308 | 2/1999 | Dangelo et al. .................... | 364/489 |
| 5,870,585 | 2/1999 | Stapleton ........................... | 395/500 |
| 5,870,588 | 2/1999 | Rompaey et al. ................... | 395/500 |
| 5,872,958 | 2/1999 | Worthington et al. .............. | 395/500 |
| 5,886,899 | 3/1999 | Stapleton ........................... | 364/490 |
| 5,909,578 | 6/1999 | Buzbee ............................... | 395/704 |
| 5,913,052 | 6/1999 | Beatty et al. ....................... | 395/500 |
| 5,918,035 * | 6/1999 | Van Praet et al. .................. | 703/21 |
| 5,943,490 * | 8/1999 | Sample ........................... | 395/500.49 |
| 5,946,472 * | 8/1999 | Graves et al. ...................... | 703/16 |
| 5,960,181 | 9/1999 | Sanadidi et al. ................... | 395/500 |
| 5,960,182 | 9/1999 | Matsuoka et al. .................. | 395/500 |
| 5,963,724 | 10/1999 | Mantooth et al. .................. | 395/500 |
| 6,009,256 | 12/1999 | Tseng et al. ................... | 395/500.34 |

OTHER PUBLICATIONS

K. Narasimhan and K. D. Nilsen, "Portable Execution Time Analysis for RISC Processors," in Proceedings of the Workshop on Architectures for Real–Time Applications, Apr. 1994.

Sung–Soo Lim, Young Hyun Bae, Gyu Tae Jang, Byung–Do Rhee, Sang Lyul Min, Chang Yun Park, Heonshik Shin, Kunsoo Park, Soo–Mook Moon, Chong Sang Kim "An Accurate Worst Case Timing Analysis for RISC Processors," IEEE Transactions on Software Engingeering, 21(7):593–604, Jul. 1995.

Frank Mueller, "Static Cache Simulation and its Applications," PhD Dissertation, Department Of Computer Science, The Florida State University, Tallahassee, FL 32306, 1994.

Randall T. White, "Bounding Worst–Case Data Cache Performance," PhD Dissertation, Department of Computer Science, The Florida State University, Tallahassee, FL 32306, 1997.

Markus Levy, "Virtual Processors and the Reality of Software Simulation," EDN, Jan. 15, 1998.

Jim Lipman, "Chip Hardware and Software: Why Can't They Just Get Along," EDN, Jul. 18, 1996.

"Verilog–C Cosimulaion at 100 Milion Instruction Execution per Second with Detailed Timing," Press Release, Fintronic USA and Vast Systems Technology Corp., Mar. 13, 1998.

G. Hellestrand, "Events, Causality, Uncertainty and Control," Proc., Asia Pacific Conference on Computer Hardware Descriptive Languages (IEEE, Inc.), pp. 221–227, Toyohashi, Japan, Oct. 1994.

S. Malik, W. Wolf, A Wolfe, T–S Li, and T–Y Yen, "Performance Analysis of Embedded System" in Giovanni De Micheli and Mariagiovanna Sami, eds, *Hardware/Software Co–Design*, (NATO ASI Series. Series E, Applied Sciences, 310.) ISBN: 0–7923–3882–0, pp. 45–74, 1996.

Vojin Zivojnovic and Heinrich Meyr, "Compiled HW/SW Co–Simulation," Proceedings, 33rd Design Automation Conference (Association for Computing Machinery, Inc.), Jun. 1996.

M. Hartoog, J. Rowson, P. Reddy, S.Desai, et al., "Generation of Software Tools from Processor Descriptions for HW/SW Co–Design," Proceedings, 34th Design Automation Conference (Association for Computing Machinery, Inc.), Jun. 1997.

G. Hellestrand, "The Engineering of Mixed Technology Systems," IEEE Circuits and Systems Society Newsletter, vol. 9, No. 2, Jun. 1998.

K. Kurshan, V. Levin, M. Minea, D. Peled, H. Yenigun, "Verifying Hardware in its Software Context," Proc., 1997 IEEE International Conference on Computer Aided Design (ICCAD, IEEE, Inc.), pp. 742–749, 1997.

M. Rosenblum, E. Bugnion, S. Devine, S. Herrod, " Using the SimOS Machine Simulator to Study Complex Computer Systems," ACM Transactions on Modeling and Computer Simulation, vol. 7, No. 1, pp. 78–103, Jan. 1997.

Richard Goering, "Conference Spotlights Crisis in Design Verification," EE Times, Mar. 20, 1998.

Richard Goering, "Vast Startup Ships Comet Co–Verification Tool," EE Times, Dec. 15, 1998.

Lisa Guerra, et al., Cycle and Phase Accurate DSP Modeling and Integration for HW/SW Co–Verification, ACM 1–581113–092, 9/99/0006, 36th Design Automation Conference (Association for Computing Machinery, Inc.), New Orleans, 1999, pp. 964–969.

Pierre Paulin, et al., High–Level Synthesis and Codesign Methods: An Appliction to a Videophone Codec, Design Automation Conference, 1995, with EURO–VHDL, Proceedings EURO–DAC '95 0–8186–7156–4/95, Apr. 1995, pp. 444–451.

* cited by examiner

HARDWARE AND SOFTWARE CO-SIMULATION INCLUDING EXECUTING AN ANALYZED USER PROGRAM

FIELD OF THE INVENTION

The present invention relates to computer hardware simulators, and more specifically, to a system and method for the simulation of an electronic system that includes one or more target processors executing software and interacting with hardware.

BACKGROUND

Computer simulation of digital hardware systems has become a common technique to reduce the cost and time required for the design of such hardware systems. Simulating digital hardware allows a designer to predict the functioning and performance of the hardware prior to fabricating the hardware. As more and more digital systems incorporate a processor, including a microprocessor, a digital signal processor, or other special purpose computer processor, there has been increased effort to develop a simulation system that includes simulating the hardware and simulating the running of software on a processor that is included in the digital system. Having such a simulation system allows a designer to test the operation of software on the processor before a physical processor is available. Thus, for example, a designer may be able to start designing a system incorporating a new microprocessor before the manufacturer actually releases physical samples of the microprocessor. In addition, a system designer designing an integrated circuit or a system on a printed circuit board that includes a processor can, for example, use the simulation system to test the integrated circuit or printed circuit board implementation, including operation of software on the processor part, and any testing interactions between the processor and the other digital circuit elements of the integrated circuit or board, before the integrated circuit or board is fabricated. This clearly can save time and money.

Such a simulation system is called a co-simulation design system, a co-simulation system, or simply a design system herein, and the environment for operating such a co-simulation system is called a design environment. The processor is called a target processor and the computer system on which the environment operates is called the host computer system. The hardware other than the processor is called digital circuitry. The computer software program that is designed by a user to operate on the target processor is called the user program.

The target processor may be a separate microprocessor with the digital circuitry being external to the microprocessor (e.g., on a printed circuit board or elsewhere in the system), or may be a processor embedded in an application specific integrated circuit (ASIC) or a custom integrated circuit (IC) such as a very large scale integrated (VLSI) device, with the digital circuitry including some components that are part of the ASIC or IC, and other components that are external to the ASIC or IC.

A design environment capable of co-simulation requires 1) the capability of accurately simulating the digital circuitry, including timing, and 2) the capability of accurately simulating on the host processor the running of the user program on the target processor, including the accurate timing of operation of the user program and of any software/hardware interaction. The first requirement is available today in a range of hardware description languages (HDLs) such as Verilog and VHDL, and simulation environments using them. It also is available as a set of constructed libraries and classes that allows the modeling of hardware in a higher-level language such as 'C' or 'C++.' The second requirement is for a processor simulator using an executable processor model that both accurately simulates the execution of a user program on the target processor, and can interact with the digital circuitry simulation environment. Such a processor simulator should provide timing information, particularly at times of software/hardware interaction, i.e., at the software/hardware interface. A processor model that includes such accurate timing information is called a "quantifiable" model herein.

One known way of providing such processor simulation is to simulate the actual hardware design of the processor. This can be done, for example, by specifying a processor model in a hardware description language (HDL). Such a model is called an architectural hardware model herein, and a processor simulator derived therefrom is called a hardware architecture simulator herein. An architectural hardware model clearly can include all the intricacies of the processor design, and thus is capable of accurate timing. Since it is written in a hardware description language, it may be treated as a hardware device in a hardware simulation environment. The main but great disadvantage of simulating the operation of the processor by simulating the hardware in some HDL is the slow execution speed, typically in the range of 0.1–100 instructions per second.

Another known way of accurately simulating the execution of software on a processor for inclusion in a co-simulation environment is an instruction set simulator (ISS), wherein both the function and the sequencing of the microprocessor is mimicked in software. An instruction set simulator still executes relatively slowly, compared for example to how fast a program would execute on the target processor. An ISS executes in the range of 1,000 to 50,000 instructions per second depending on the level of timing and operational detail provided by the model.

Both the ISS and the architectural hardware model approaches to simulating software are relatively slow, and users of such environments often express frustration at their inability to run simulations at practical speeds. HDL and ISS microprocessor models limit the number of software cycles that can be properly verified on a hardware-software modeling system; a few thousand per second is all they allow. On the other hand, real systems execute 50–1000 million instructions per second or more. From this arises a disparity of a factor between about 10,000 to 200,000 in performance, so that 3 to 60 hours of simulation may be needed to model 1 second of real-time target processor performance.

One solution to the slow speed of simulating a processor is to use a hardware processor model. This device includes a physical microprocessor and some circuitry for interfacing and interacting with the design environment simulating the digital circuitry. The memory for the target processor is simulated as part of the digital circuitry. Such an approach is fairly expensive. Another limitation is due to having two definitions of time operating on the same simulation system: simulation time of a hardware simulator, and processor time, which is real time for the hardware processor. Correlating these is difficult.

Another solution is to use an emulator as the target processor model. An emulator, like a hardware processor model, is a hardware device, typically the target processor, and usually includes some memory. The emulator is designed to emulate the operation of the microprocessor. Such a processor emulator when it includes memory can execute the user program directly, but again is expensive and may require the development of external circuitry to interact with the hardware simulator simulating the digital circuitry. U.S. Pat. No. 5,838,948 describes an environment that uses an emulator for speeding up the running of a user program in the design environment.

Thus there still is a need for a design environment that operates on a host computer system which includes a mechanism for rapidly simulating the operation of a target processor.

Behavioral processor simulators are known that can run a user program on the host computer system. With such an approach, the functional outcome of the software execution is combined with the outcome of executing the hardware models described, for example, in an HDL. While such processor models can run at more than 100 million instructions per second and have reasonable functionality, they include no timing or architectural precision, for example to accurately simulate the interaction between the digital circuitry and the processor.

Thus there still is a need for a design environment that operates on a host computer system which includes a mechanism for rapidly simulating the operation of a target processor with timing accuracy and the ability to model hardware/software interaction.

One of the requirements for accurately simulating a processor is architectural precision. For example, modern processors include an instruction pipeline that enables the different stages of handling an instruction to be overlapped. For example, a simple modern pipeline may have the following 5 stages: instruction fetch (IF), instruction decode (ID), execute (EX), memory access (MEM) and write back (WB). After the pipeline is filled, the processor is capable of executing instructions five times faster than it would take an individual instruction to complete all five states. However, pipeline hazards are known that cause a pipeline to stall. For example, hazards occur because instructions that are overlapped in execution may require processor resources simultaneously, with insufficient resources available to service all the requirements of the instructions simultaneously. Hazards also may occur when one instruction is dependent on a preceding instruction, and the dependency cannot be satisfied because the instructions overlap in the pipeline. It is desired to be able to accurately simulate the operation of the user program, including taking into account pipeline effects such as hazards. Hardware architecture simulators and instruction set simulators can be specified to include these intricacies, but, as described above, such processor simulators are inherently slow. Thus, there is a need in the art for a processor simulator that can simulate a user program operating on a target processor with reasonable speed. There also is a need in the art for a design system that simulates an electronic system that includes digital circuitry and a target processor having a pipeline, the design system including a processor simulator that can simulate a user program operating on a target processor with reasonable speed. There also is a need in the art for a processor model of a target processor that has a pipeline for use in a design system that simulates an electronic system that includes digital circuitry and the target processor, the model providing for rapid simulation of a user program operating on a target processor and taking into account timing and pipeline effects such as pipeline hazards.

While sometimes it is desired to run a simulation with great precision at a high level of detail, at other times, less detail may suffice, enabling faster execution of the simulation. There therefore is a need in the art for an executable and quantifiable processor model that can be used in a co-simulation system and that models the operation of the target processor at an elected level of detail, including an elected level of detail at the hardware/software interface.

Computer networks are becoming ubiquitous, and it is desired to be able to operate a co-simulation design system on a computer network, with different elements of the design system running on different processors of the computer network to speed execution. Similarly, multiprocessor computers are also becoming commonplace, and it would be desirable to be able to operate a co-simulation design system on a computer network, with different elements running on different processors of the computer network.

Electronic systems nowadays may include more than one target processor. It is therefore desirable to have a co-simulation design system that provides for rapidly simulating such an electronic system, including simulating respective user programs executing on the target processors, such processor simulation providing timing detail that takes into account instruction timing and pipeline effects for target processors that include a pipeline.

SUMMARY

The broad goal of the invention is a method and system for rapidly simulating on a host computer system a target processor executing a user program. One feature of the invention is providing a processor model for the target processor that operates up to the host processor speed and yet takes into account instruction timing. As an additional feature, the processor model also takes into account pipeline effects such as pipeline hazards. Another feature of the invention is such a processor model that a user can modify to include more or less detail. Another feature of the invention is such a processor model that can be incorporated into a design system that simulates an electronic circuit that includes the target processor and digital circuitry. Another feature of the invention is using more than one such processor model in a design system that simulates an electronic circuit that includes more than one target processor and digital circuitry.

Described herein is a design system operating on a host computer system and simulating an electronic system that contains target digital circuitry and a target processor having a pipeline, the design system comprising a hardware simulator simulating the target digital circuitry, a processor simulator simulating the target processor executing a user program by executing the user program substantially on the host computer system, and an interface mechanism that couples the hardware simulator with the processor simulator including passing information between the hardware simulator and the processor simulator. The hardware processor provides a simulation time frame for the design system. In one version, at significant events, including events that require the user program to interact with the target digital circuitry, the operation of the processor simulator is suspended and associated event information is passed from the processor simulator to the hardware simulator. The operation of the processor simulator then is resumed when the hardware simulator processes information and passes an event result back to the processor simulator.

The processor simulator accumulates a simulation time delay when operating, the simulation time delay determined using timing information that accounts for instruction timing including pipeline effects. The timing information is determined by an analysis process performed on the user program in accordance to characteristics of the target processor including instruction timing characteristics and pipeline characteristics.

According to one aspect of the invention, the hardware simulator passes resumption control information to the processor simulator after the most recently accumulated simulation time delay has been consumed by the hardware simulator.

The static analysis process comprises decomposing the user program into linear blocks of one or more instructions; determining the time delay for each linear block of the user program using characteristics of the target processor; and combining the linear block timing information with the user program to determine the timing information for the processor simulator.

In one embodiment, the hardware simulator runs on an HDL and at least some of the digital circuitry is specified in the HDL. In another embodiment, all or some of the digital circuitry is described to the hardware simulator in a higher-level language such as such as 'C' or 'C++.'

In accordance with another aspect, a method is described of simulating on a host computer system the execution of a user program on a target processor having a pipeline, the method comprising decomposing the user program into linear blocks, determining linear block timing information including the time delays that would be incurred executing each linear block of the user program on the target processor, and executing the combined user program and linear block timing information on the host computer system, such that the execution on the host computer system simulates the execution of the user program on the target processor including providing accurate execution timing that takes into account instruction timing and pipeline effects. The determining of the block timing information uses characteristics of the target processor, including instruction timing and pipeline characteristics, so that the block timing information takes into account instruction timing and pipeline effects. The determining of the block timing information also includes combining the linear block timing information with the user program.

One implementation described is when the user program includes statements in a higher-level language such as 'C', 'C++', Java®, ADA, FORTRAN, ALGOL, PASCAL, SIMULA, LISP, APL, and so forth. In this implementation, the step of decomposing the user program into linear blocks includes parsing the user program to determine linear block boundaries. The determining of the time delay for each linear block then further comprises cross compiling the user program to produce target code, parsing the cross compiled target code to determine the time delay for each line in each section of the target code corresponding to each linear block in the user program, and determining the time delay for each linear block of the user program from the time delays determined in the target code parsing step. The time delay determination uses characteristics of the target processor. According to a particular implementation, combining the linear block timing information with the user program produces an analyzed user program that includes instructions for accumulating the timing delay, and the executing step executes the analyzed user program on the host processor.

In accordance with another aspect of the invention, described herein is a method for creating a model for simulating the operation of a target processor on a host computer system. The model comprises a processor model shell for operation on a hardware simulator that simulates activity of one or more entities of the target processor accessible to digital circuitry external to the processor. The model also comprises a software shell to provide a user program programming access to the signals accessible to digital circuitry external to the processor. Also in the model is target processor specific information for use in analyzing a user program to determine user program timing information such that when the user program is run on a processor simulator operating on a host computer system, the processor simulator accurately simulates execution as if the user program was executing on the target processor, including providing timing that takes into account instruction timing and pipeline effects. The user program analyzing process includes decomposing the user program into linear blocks, determining linear block timing information including the time delays that would be incurred executing each linear block of the user program on the target processor. The determining of block timing information uses the target processor specific information, and the determined block timing information takes into account instruction timing and pipeline effects.

In a particular implementation, the processor model shell includes an interface to hardware description language instructions such as VHDL or Verilog instructions, and the software shell comprises an interface code written in a higher-level computer language, such as 'C' or 'C++'. In another version in which the hardware simulator provides for simulating digital hardware in a higher-level language, the processor model shell includes an interface to code in such a higher-level computer language.

The determination of the time delay for each linear block includes cross compiling the user program to produce target code, parsing the cross compiled target code to determine the time delay for each line in each section of the target code corresponding to each linear block, and determining the time delay for each linear block of the user program from the time delays determined in the target code parsing step. According to this particular implementation, the target processor specific information includes information on how to parse and calculate the timing information of the cross-compiled target code.

Other features and aspects of the invention will become clear from the detailed description that follows.

DESCRIPTION OF THE FIGURES

The present invention will be more fully understood from the detailed preferred embodiments of the invention, which, however, should not be taken to limit the invention to any specific embodiment but are for explanation and better understanding only. The various embodiments in turn are explained with the aid of the following figures.

DETAILED DESCRIPTION OF THE PREFERRED EMBODIMENTS

Figure 1:
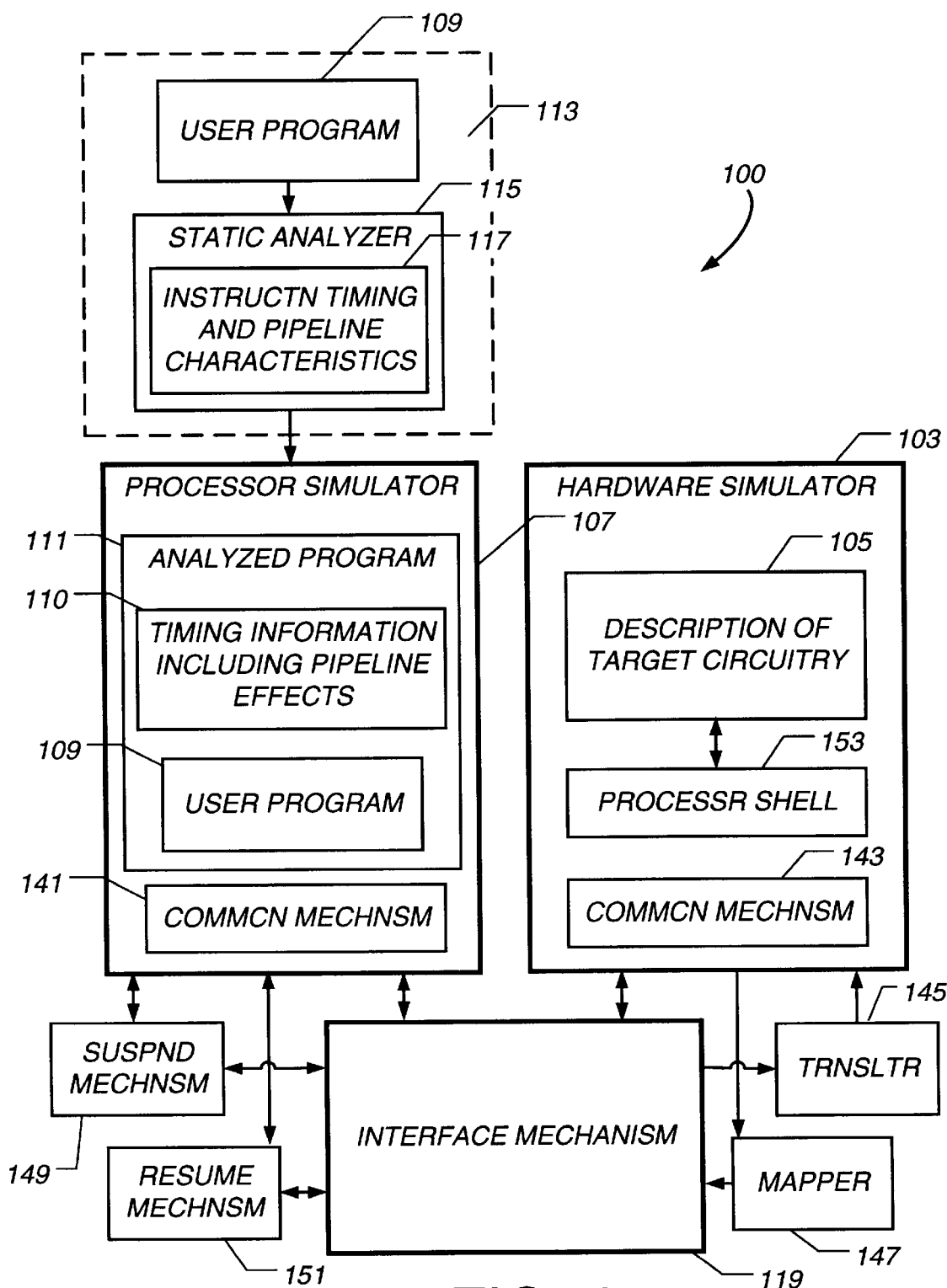
FIG. 1 shows a single processor embodiment of a co-simulation design system according to the invention.

The first one or two digits in a reference numeral indicate on which figure that reference numeral is first introduced. For example, any reference numerals between 100 and 199 are first introduced in FIG. 1, any between 200 and 299 are first introduced in FIG. 2, any between 1000 and 1099 are first introduced in FIG. 10, and so forth.

The method, processor model, and system embodiments of the invention include components that operate on a host computer system. The host computer system may be a single computer, for example, a computer workstation. Such workstations are readily available, and may operate under any operating system (OS) such as any variants of the UNIX operating system (including LINUX™), or any variants of Microsoft Windows® (e.g., Windows NT, Windows 98, or Windows 2000 from Microsoft Corporation, Redmond, Wash.), or the Mac OS® (Apple Computer, Cupertino, Calif.). Some embodiments operate under a computer network that includes a plurality of host processors interconnected as a network, while other embodiments run on a multiprocessor computer that includes a plurality of host processors. The term "host computer system" thus means a computer system with a single host processor, or a plurality of interconnected host processors that may be interconnected as a network, or a multiprocessor computer.

FIG. 1 shows a design system embodiment of the present invention. Design system 100 operates on a host computer system and simulates an electronic system that contains target digital circuitry and at least one target processor executing a user program. The target processor typically has a pipeline. A hardware simulator 103 simulates the target digital circuitry. In the preferred embodiment, the hardware simulator operates in a hardware description language, in particular Verilog, and so the description 105 of the target digital circuitry is provided by the user in the form of Verilog code. The invention can also work with other hardware description languages such as VHDL, and with hardware descriptions in terms of libraries, or libraries and classes written in a higher-level language such as 'C,' or 'C++.' Thus, the invention does not depend on the particular hardware models used in the hardware simulator 103.

Co-simulation design system 100 also includes a processor simulator for each processor that simulates the target processor executing the user program, and one such processor simulator is shown as 107. The processor simulator 107 executes the user program substantially on the host computer system, which provides for extremely rapid simulation of the software. While only one processor is shown, the simulation system can accommodate additional processor simulators of additional target processors to simulate a multiprocessor system.

Processor simulator 107 simulates execution of a user program 109 on the target processor by executing an analyzed version 111 of the user program 109. The analyzed version of the user program is thus a program derived from the user program by an analysis process. The analyzed version includes the user program, and timing information on how the target processor would execute the user program 109 such that while the host processor executes the analyzed version 111 of the user program, the processor simulator 107 generates accurate execution timing information incorporating the target processor instruction timing as if the user program 109 was executing on the target processor. Since most modern processors have a pipeline, and pipeline effects such as hazard conditions have a significant effect on instruction timing, incorporating pipeline effects in the execution timing information increases accuracy.

An interface mechanism 119 is coupled to both the processor simulator 107 and the hardware simulator 103 and enables communication between processor simulator 107 and hardware simulator 103. Processor simulator 107 includes a communication mechanism 141 to pass information to the hardware simulator 103 using the interface mechanism when an event requires interaction of user program 109 with the target digital circuitry. Such events include times when user program 109 encounters an input/output instruction, or when the program has an arithmetic exception during execution, and other significant events. The hardware simulator 103 also includes a communication mechanism 143 to pass information to processor simulator 107 using the interface mechanism at events significant to the hardware simulator 103 that need to be communicated to the processor simulator. Such an event includes when a signal in the target digital circuitry connected to the target processor is asserted, for example, an interrupt.

The interface mechanism 119 passes the information across the hardware/software boundaries. The preferred embodiment interface mechanism 119 includes a message passing kernel. Thus, in the preferred embodiment, both the processor simulator and the hardware simulator communication mechanisms 141 and 143 are included in interface mechanism 119. Also, the processor simulator and the hardware simulator are tasks under the kernel, and the kernel provides the mechanism for the tasks to communicate whenever one or the other task requires it. When several processor simulators operate, each runs independently as a task under the kernel.

Those in the art will appreciate that other types of interface mechanisms are possible, including using multiple threads, and using a complete or partial operating system.

The hardware simulator and the processor simulator each has its own definition of time, i.e., its own time domain, with the interface mechanism providing a mechanism to synchronize time whenever processor simulator 107 and hardware simulator 103 need to communicate. Similarly, when several processor simulators operate, each processor simulator has its own concept of time, as does the hardware simulator.

As shown in block 113, the analyzed version 111 of the user program is obtained by an analysis process performed on user program 109 by static analyzer 115. Analysis is described in more detail below and briefly includes decomposing the user program into linear blocks (which can be as short as a single instruction) and then calculating for each linear block the time delay that would be incurred by executing that linear block on the target processor. The time calculating uses characteristics 117 of the particular target processor, including instruction timing and characteristics of the processor. Such processor characteristics may include pipeline characteristics so that the result is the analyzed program which includes the instruction of user program 109, and timing information 110 that includes pipeline effects.

While the analyzed program 111 of the preferred embodiment includes the timing information 110 in the form of additional programming instructions that accumulate a simulation time delay while the user program is executed, in alternate embodiments, the timing information may be included in the analyzed version in the form of a timing information data structure, such as an array of timing delays for each block. In such a case, the processor simulator would include instructions external to the analyzed version of the program to accumulate the delay while the user program is executing on the host computer system.

When an event occurs that requires the processor simulator to communicate to the hardware simulator, the processor simulator's communication mechanism 141 sends information to hardware simulator 103 associated with the event through the interface mechanism 119. The hardware processor receives the associated event information and processes it. Typically, the event may be an input/output instruction in the user program to send information or to poll a port or otherwise to interact with the hardware simulator.

The associated event information preferably includes time delay information indicating an amount of simulated time since a previous event occurred, such as when the processor last started or resumed operation, or when the processor simulator last sent event information, or when the hardware simulator last received event information. The hardware simulator 103, upon receiving the time delay information, executes for an appropriate amount of hardware simulation time.

The design system 100 also includes a translator 145 that translates information from a first format understandable in the user program domain, e.g., a program function call or a memory mapped I/O instruction, to a second data format understandable in the hardware simulator domain, for example, when the digital circuitry is described in HDL, by some HDL code to indicate signal line assertion. For example, when the user program is in 'C' and the target digital circuitry is defined in Verilog, the translator 145 can translate a C variable passed to an output function call to the corresponding Verilog variable in the digital circuitry description.

Typically, the processor simulator 107 operates much faster than the hardware simulator 103. That is, simulation time is consumed much faster (in real time) on a processor simulator than on a hardware simulator because hardware simulator 103 of design system 100 models the digital circuitry 105 in detail, while the processor simulator 107 does not model the architectural detail of the target processor, but rather runs the user program substantially on the host computer system. The timing detail comes as a result of the analysis process 113 and in accumulating the delay during processing using timing information 110.

In the preferred embodiment, the hardware simulator provides a simulation time frame for the design system. That is, simulation time is started and maintained by the hardware simulator, and whenever synchronization is required, all times are synchronized to the hardware simulation time, which is the simulation time for the system.

The design system also includes a suspend mechanism 149 and a resume mechanism 151 coupled to the processor simulator that allow the processor simulator to suspend and resume operation. In the preferred embodiment, the suspend and resume mechanisms are in the interface mechanism 119 and provide for suspending and resuming operation of any task. In the preferred embodiment, when the processor simulator sends associated event information which includes time delay information, it passes a message to the kernel in the interface mechanism that causes the processor simulator to be suspended. The resumption mechanism uses the interface mechanism to place events on an event queue in the hardware processor. Thus, when the processor simulator suspends, the kernel also restarts the hardware simulator and places instruction in the hardware simulator's event queue to resume the processor simulator at some later time. The hardware processor then continues until an event is reached which causes the processor simulator to resume, for example, a previously scheduled resumption of the processor simulator in its event queue.

Thus, in the preferred embodiment, the suspend and resume mechanisms of the interface mechanism 119 use an event queue which is in the hardware simulator. Those in the art will appreciate that other interface mechanisms and resume and suspend mechanisms may be used. For example, in an alternate embodiment, the processor simulator and the hardware simulator are independent tasks running under the interface mechanism, and the interface mechanism scheduled all tasks by maintaining its own one or more event queues.

Thus, in the preferred embodiment, when associated event information including time delay information is sent by processor simulator 107 to hardware simulator 103, the suspend mechanism suspends operation of processor simulator 107 while hardware simulator 103, upon receiving the time delay information, executes for an appropriate amount of hardware simulation time. Once hardware simulator 103 processes the event information and produces an event result, such as a signal being asserted, or simply the time delay being consumed, it typically sends the event result to processor simulator 107. The resume mechanism 149 resumes operation of processor simulator 107 upon the processor simulator receiving the event result.

Note that if no time delay needs to be executed by the hardware simulator, such as when the processor simulator is already in time synchronization with the hardware simulator, the processor simulator need not suspend operation. As another example, the user program may encounter a program that asks only for the current hardware simulation time. Or the user program may encounter an input/output command before the processor simulator has accumulated any delay since the last access to the hardware simulator. There would not be any need to suspend operation under such circumstances.

With the suspend/resume mechanisms of the preferred embodiment, when the processor simulator's execution is suspended, the delay time passed to the hardware simulator is used to schedule the resumption of the suspended task, by placing a delay event on the hardware simulator queue to have the interface mechanism to resume executing the suspended user program task running on the processor simulator.

One event result may be an interrupt that occurs in the digital circuitry during the execution of the time delay. The interrupt is communicated to the processor simulator 107, and upon receipt of this event result, on resumption of the processor simulator, processes the interrupt by calling an interrupt handler.

The design system 100 also includes a processor shell 153 in hardware simulator 103 that simulates activity of at least some of the external hardware entities of the target processor, in particular, those signals that are connected to the digital circuitry of the target electronic system which affect a user program. Included are those hardware variables and other hardware entities the user program may access or that may generate asynchronous events such as interrupts. As an example, the hardware shell provides access to the reset line or the pause line of a processor. The processor shell normally would provide an interface to the hardware simulator in the hardware description language(e.g., Verilog). Note that by "signal" we mean a signal or a hardware variable or an event or any other general entity defined within the hardware simulator.

The design system 100 also includes a mapper 147 that translates information from the second format understandable in hardware simulator domain, such as a signal assertion to indicate some asynchronous event, or register contents, or simulation time, to the first data format understandable in the processor simulator domain, for example, to one or more software variables accessible to the user program.

Since simulation speed is extremely important, and since a single host processor can only process a single task at a time, the invention also provides for carrying out the simulation in a multiprocessor computer that includes several host processors. In such a system, the processor simulator operates on one or more of the host processors, while the hardware simulator operates on one or more other host processors. The interface mechanism is programmed to handle the communication between the processor simulator host processor, and the other host processors executing the processor simulator. How to implement such an arrangement would be clear to those in the art.

The invention also provides for carrying out the simulation in a host computer system that includes several host processors interconnected using a network connection. In such a system, the processor simulator operates on one or more of the host processors, while the hardware simulator operates on one or more other host processors. The mapper and the translator also may operate on a separate host processor of the network. That is, the processor simulator is coupled to the mapper and the translator by a first computer network connection, with the interface mechanism controlling communication between the processor simulator and the mapper and translator over the first network connection. Also the hardware simulator is coupled to the mapper and to the translator by a second network connection, with the interface mechanism controlling communication between the mapper and the translator, and the hardware simulator over the second network connection.

Note that the tasks of an individual processor simulator can be split across several host processors of the host computer system. Similarly, the tasks of the hardware simulator can be split across more than one host processors of the host computer system. Other networked or standalone multiprocessor combinations and permutations of operating the elements of the design system will be clear to those in the art.

A Design Example

A typical electronic system that can be simulated using the preferred embodiment co-simulation design system can include many components that are either in the form of digital circuitry or as software comprising one or more user programs to run one or more target processors. The digital circuitry is implemented using an HDL. Software components include the user programs, and may include behavioral modeling of some hardware components.

Figure 8:
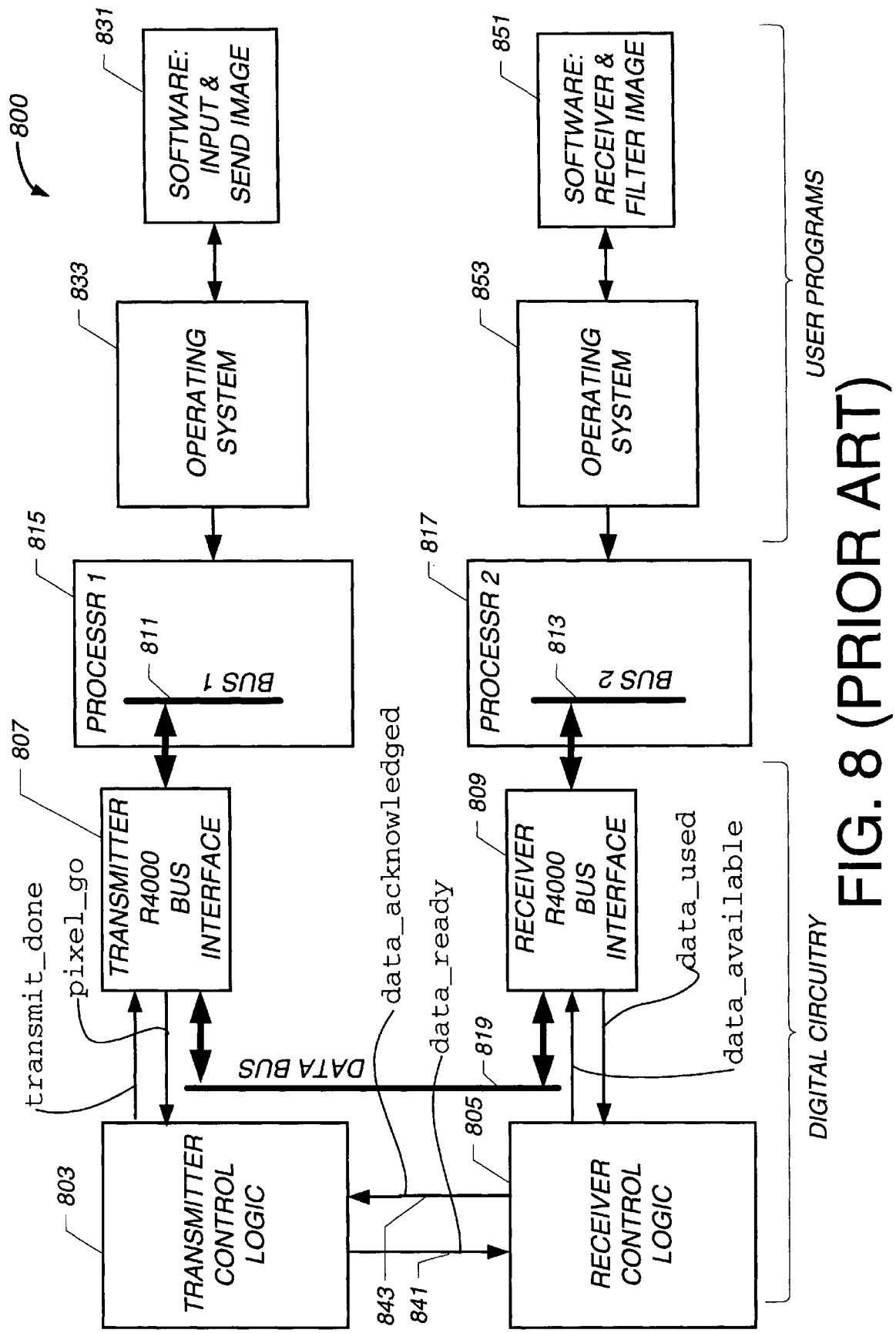
FIG. 8 shows an example dual processor electronic system that may be designed using a co-simulation design system according to the invention.

Various aspects of the invention will be explained with reference to an example electronic system using those aspects to design the example system. The example electronic system, which in itself is prior art, is illustrated in FIG. 8.

The particular electronic system 800 of the example includes two target processors named processor 1 and processor 2, each a MIPS R4000 processor (MIPS Technologies, Inc., Mountain View, Calif.). The two target processors communicate through a simple protocol implemented in a transmitter control logic module 803 and a receiver control logic module 805. The transmitter control module 803 is interfaced to the busses 811 an 813 of target processors 1 and 2, respectively, via a transmitter R4000 bus interface module 807 and a receiver R4000 bus interface module 809, respectively.

The electronic system includes two major software components, the Image_TX and the Image_Filter. Image_TX is a software module written in 'C' to run on target processor 1 (shown as 815) under operating system control. Image_TX is shown as software module 831 and the operating system as module 833. When started, Image_TX reads in an image file then transfers the image, pixel by pixel, to another software module Image_Filter, shown as module 851, by using an asynchronous data bus 819. Software module Image_Filter runs on the second target processor, processor 2 shown as 817, under an operating system 853. After Image_Filter 851 has completed the filter operation, it displays the image.

The transmitter and receiver control modules 803 and 805 are hardware modules, and make use of the two signals (data_ready 841, data_acknowledge 843) in a two-signal asynchronous protocol to transfer data from processor 1 to processor 2 to enable processing by software module 851 of data transmitted by software module 831. The data bus 819 also is modeled in Verilog.

In this system, the Image_TX module 831 is a user program in 'C' code running on an embedded system (in this example a MIPS R4000 system). This software module communicates with the hardware through a set of interfacing registers in transmitter bus interface 807. The registers in turn communicate with a set of interfacing registers in receiver bus interface 809 through the data bus 819, which is a tri-state buffer. Data bus 819 and the receiver control module 805 are parts of the digital circuitry of electronic system 800.

The sequence of operations for the example is as follows.

When the system is started (assertion of a signal called start and not shown), the software Image_TX will read in an image from a file called IMAGE.PXL. The size (number of columns and rows) and scaling factor are used to form a header. The header together with the image pixels is used to form a memory array. The Image_TX then activates the data bus by setting it to transfer mode, and starts transferring the data in the memory array to the second processor, in particular, user program Image_Filter, by using the transmitter and receiver (two-signal asynchronous protocol). In transfer mode, the tri-state buffers (which drive the data bus) on the Image_TX's side are enabled, whereas those on the Image_Filter side are disabled.

At the same time, the program Image_Filter receives all the data via the data bus using the two-signal asynchronous protocol with receiver control logic module 805, and stores the data in local memory. Image_Filter will the apply the mean and median filter on the image using a 3×3 window. The result (median image) is stored in an output buffering memory array. Image_Filter then displays the image Operation of a multiprocessor system such as the example system of FIG. 8 will now be described with the aid of FIG. 2 which shows a design system 200 with two processor simulators 207 and 208 simulating the operation of software program 831 on processor 815 and software program 851 on processor 817. The hardware simulator 203 simulates digital circuitry 205 which includes the models of transmitter control 803 and transmitter bus interfaces 807 (FIG. 8) as image transmitter circuitry 225, receiver control logic 805 and receiver bus interface 809 as image filter circuitry 227, and the data bus 819. There also are processor shells for both processors providing a software interface in the respective processor simulator for the required control signals to and from the transmitter and the receiver bus interfaces.

Note that co-simulation design system 200 is basically co-simulation system 100, with an additional processor simulator. The operation thus follows that decribed above for design simulator 100.

An interface mechanism comprising a message passing kernel is included coupled to the two processor simulators and to the hardware simulator. The interface mechanism in this embodiment includes the mapper and translator. The interface mechanism also includes a single suspend mechanism and a single resume mechanism to provide for suspending and resuming the operation of each of the processor simulator tasks.

The host computer system may include a computer network, the processor 1 simulator 208 and processor 2 simulator 207 may each run on different host processors of the network, so that the processor simulators are coupled to the hardware simulator by network connections. In such a case, the interface mechanism would control communications over the network connections.

Note that while two processors are shown here, it will be clear to those in the art from this two-processor example how to extend the system to simulating the operation of any number of processors.

Operating System and Assembly Language Support

User software usually operates in a target processor under the control of an operating system. The invention supports operating system (OS) modeling, and such OS included by several methods and means.

The preferred embodiment supports three ways. The first is to emulate the function and timing of the target operating system using a message passing operating system called EMERE herein. This is a very effective mechanism, especially when the user application code for operation on the target processor uses POSIX style system calls, for example, open, create, read, write, seek, and close.

A second way of including OS modeling is to use a target OS simulator. Several such operating system simulators are available. For example, VxSim™ simulates the VxWorks™ operating system (VxSim and VxWorks from Wind River Systems, Inc, Alameda, Calif.). This strategy delivers function and average timing, but not timing for the actual run.

A third approach is to include the target operating system as part of the user program in the simulation environment. Since the invention provides for rapid processor simulation speeds that simulate execution at speeds at or close to the same order of magnitude as the actual execution speed of the user program on the host computer system, the simulation environment of the present invention has the speed to boot a complete OS and application software. One way of doing this is to include the source code of the OS. This clearly requires having access to the OS source code, and also knowledge of the operating system. As an alternative, one can disassemble the object code of the target OS into assembly code, which can then be included in the user program as described in the next paragraph. This third approach provides complete function and timing.

The invention also provides for several mechanisms for manually including assembly code in a user program. One mechanism to incorporate the assembly code into 'C' code is to use a construct such as the 'asm' construct of 'C' for the Gnu GCC compiler (Free Software Foundation, Boston, Mass.). This identifies a block of target assembly code embedded within the 'C' code. The analyzer process regards this as a single block of code and produces appropriate model timing and functionality accordingly. If there is a lot of assembly code, then yet another technique for adding assembly code is to break the code up into basic linear blocks and separately embed each basic block into the 'C' code, for example using an 'asm' construct. This helps the analyzer to correctly model pipeline interactions. Yet another way to include assembly code is to convert it to equivalent 'C'. Object code also may be added to a user program. Doing so is a variation of adding assembly code. The user first disassembles the target object code using a disassembler. The resulting assembly code can then be added.

Operation of the invention

Operating the invention will now be described. The preferred embodiment provides a view of the simulation environment using a debugger, and other embodiments do not necessarily use a debugger. A waveform viewer also is provided for viewing any of a set of desired hardware variables. In particular, the Gnu GDB debugger is used (Free Software Foundation, Boston, Mass.), and other debuggers may used instead. While the invention does not require use of an HDL for the hardware simulator, the description will be provided using Verilog, and using the Super FinSim™ Verilog simulator from Fintronic USA (Menlo Park, Calif.).

Thus, in the preferred embodiment, the debugger starts the simulation, and in the preferred embodiment first starts the kernel in the interface mechanism. The kernel thus starts the hardware simulation as a task. As the hardware simulation progresses, it invokes one or more processor simulators by passing a message to the interface mechanism which then starts the processor simulators as tasks under the message passing kernel.

A tool is provided for setting up all the files required. The user programs may need to be modified for operation in the co-simulation design system by replacing some of the input/output commands that interact with hardware with the equivalent calls that are available in the system (See under "Interface Functions" herein below). In addition, some of the operating system calls may have to be changed to those of the particular operating system used in the simulation when the simulation environment and the final target system are to be run under different operating systems. These changes are to account for differences between the simulation included operating system and the final target operating system.

Figure 10:
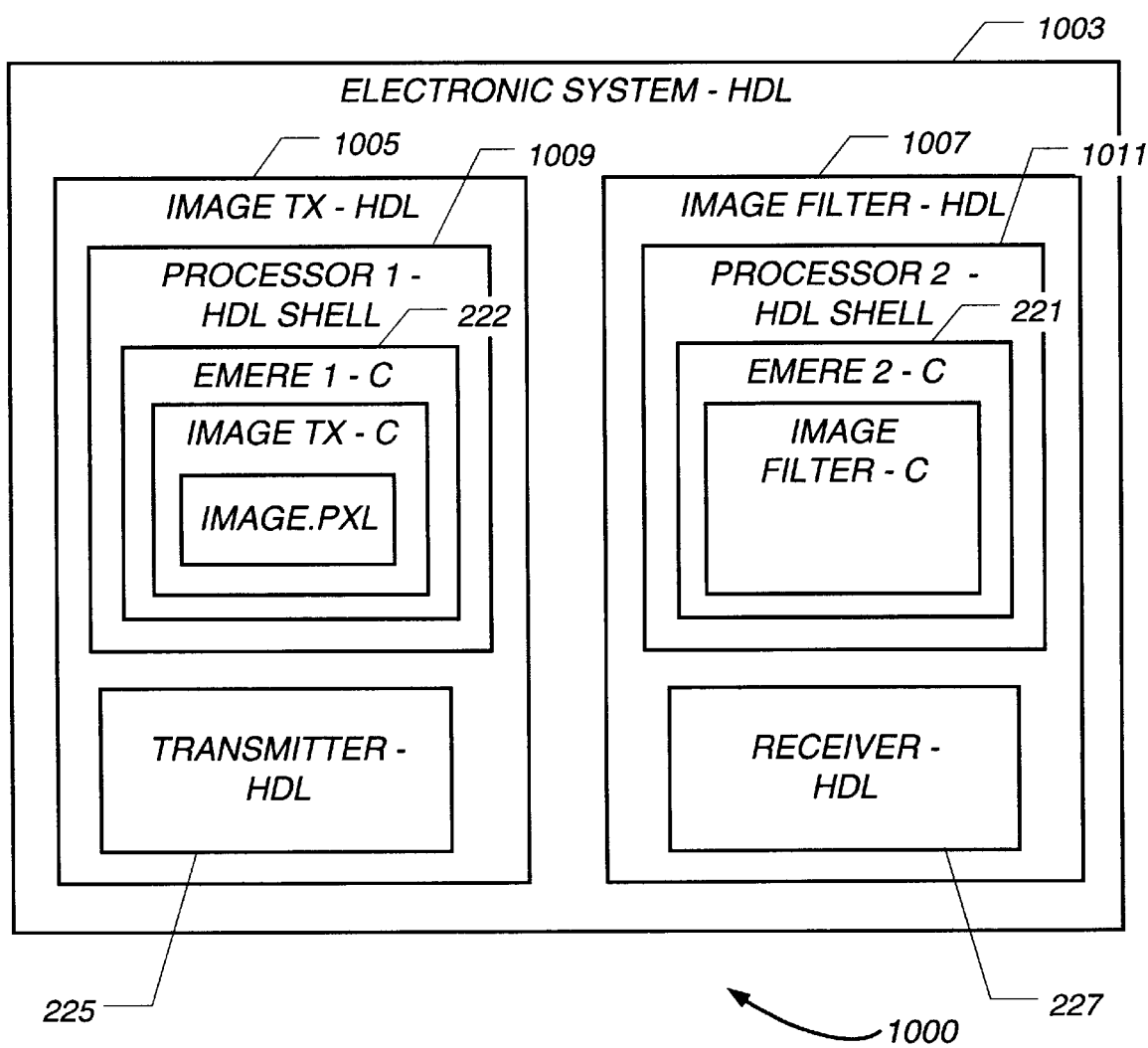
FIG. 10 shows a set of modules used to simulate the system of FIG. 8 according to an embodiment of the invention.

Sample modules that might be set up to simulate the example of FIG. 8 are shown in module arrangement 1000 in FIG. 10.

Figure 2:
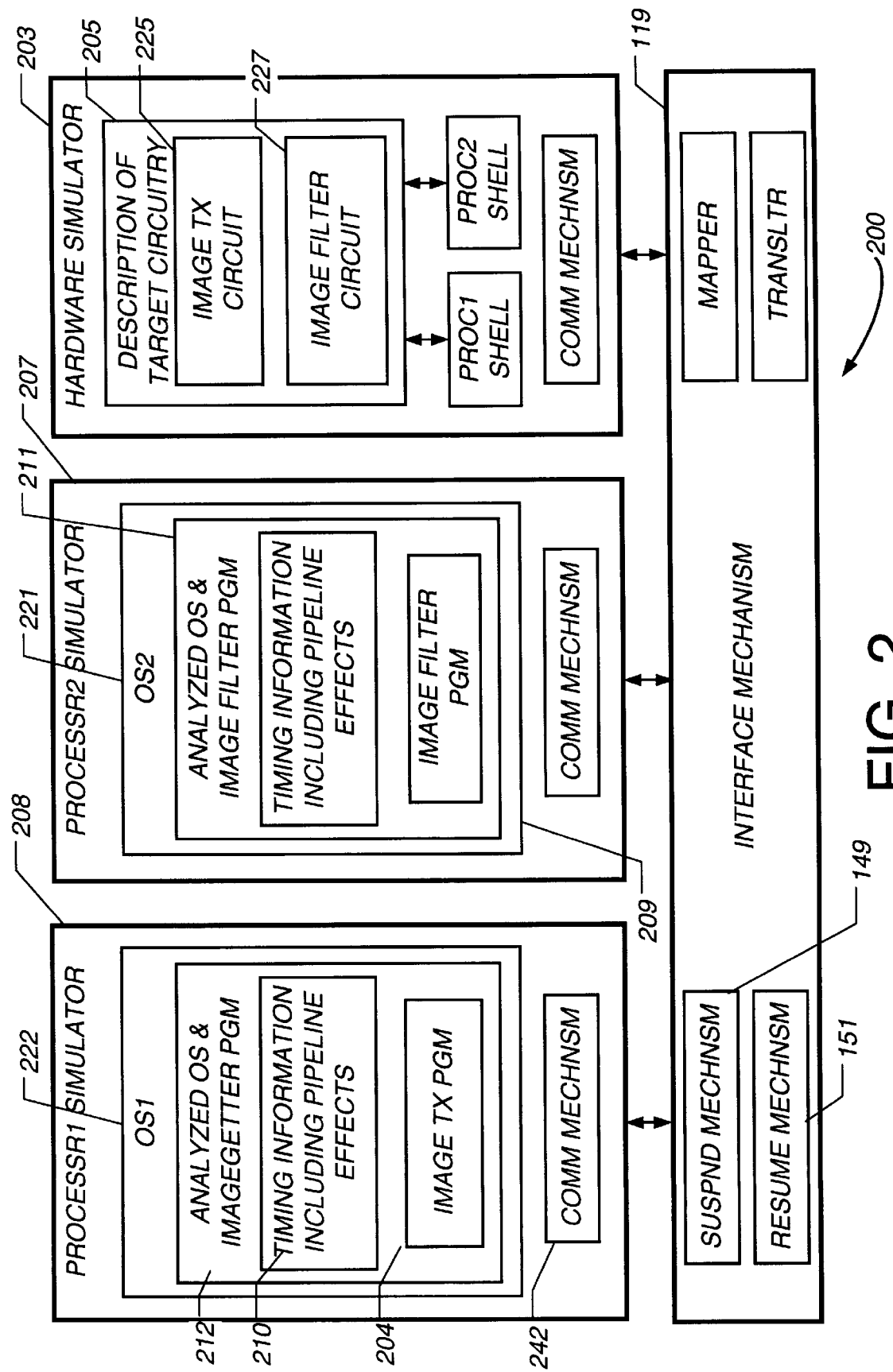
FIG. 2 shows a dual processor embodiment of a co-simulation design system according to the invention.

Electronic System 1003 is the top level Verilog module that instantiates two Verilog modules, Image TX 1005 and Image Filter 1007. Image TX module 1005 is a Verilog module which instantiates the Transmitter Verilog module that includes the transmitter part of the digital circuitry (Image TX Circuit 225), and the Processor 1 Verilog shell 1009. The Processor 1 shell 1009 in turn is used to instantiate processor 1 simulator 208. Image Filter module 1007 is a Verilog module which instantiates the Receiver Verilog module that includes the receiver part of the digital circuitry (Image Filter Circuit 227), and the Processor 2 Verilog shell 1011. The Processor 2 shell in turn is used to instantiate processor 2 simulator 207 (FIG. 2).

In instantiating processor 1 simulator 208, the processor 1 HDL shell instantiates a copy of the EMERE operating system, EMERE1 222. EMERE 1 starts up the Image TX program, the C program to carry out the file retrieval and image transmitting. This in turn has a pointer to the image pixel file IMAGE. PXL that contains the image data.

In instantiating processor 2 simulator 207, the processor 2 HDL shell instantiates another copy of the EMERE operating system, EMERE 2 shown as 221. EMERE 2 starts up the Image Filter program, the C program to carry out the image filtering function.

Thus, the debugger starts the simulation, and typically first starts the kernel in the interface mechanism that in turn starts the hardware simulation. The first task is a hardware task, and some processor shell signal being asserted in the hardware starts the C language modules (the two operating system modules).

The Verilog implementation takes advantage of the availability in Verilog of the ability to include code in another language, in particular, the programming language interface (PLI) mechanism of Verilog, to invoke a user task/function (a processor simulator) from a hardware description. In the preferred embodiment, This mechanism is used to invoke the processor simulator from the hardware simulator via the interface mechanism. When a PLI gets started, the interface mechanism has control and is then able to start the processor simulator. In particular, the processor simulator, and in particular the operating system, is spawned from the Verilog wrapper every time the system receives a positive transition on a start signal called start.

```
void
emere1_pli (void)
{
    VAST_START_EMERE(image_loader);
}/* emere1_pli( ) */
```

During operation, this causes the interface mechanism, to start the processor 1 simulator.

VHDL also includes a mechanism called foreign attribute/ entity for including a module not in VHDL in a VHDL simulation, and the VHDL implementation of the invention uses the foreign attribute mechanism to start the processor simulator from the hardware simulator with some signal that is part of the processor shell. During operation, this causes the interface mechanism to start the processor 1 simulator.

Thus in the preferred embodiment described herein, the hardware simulator is first invoked by the kernel and any processor simulators are then started later by the hardware simulator (via the interface mechanism). In an alternate embodiment, the interface mechanism could include all control, so that the software tasks such as the processor simulators are not started by a mechanism such as a PLI in the hardware simulator, which then leads the interface mechanism to start the processor simulator, but rather the interface mechanism would control the processor simulator and the hardware simulator using one or more event queues in the interface mechanism. In yet another alternate embodiment, the processor simulator can initiate the hardware simulator.

Prior to execution, the user may insert debugger breakpoints in the user programs for each processor simulator. Prior to execution the user can enable or disable the breakpoints. As the simulation is run under debugger control, whenever a breakpoint is encountered, the debugger stops execution. At this point, any software variable in any of the processor simulators and any hardware variable in the hardware simulator may be examined. The particular implementation of the invention provides a window on the viewer screen for each of the processor simulators and for the hardware simulator. When the systems stops at a breakpoint, the current instruction is highlighted. In addition, the implementation provides a "voltmeter"-like "value watch" window, at user option, to examine any hardware entities as the simulation proceeds. The environment also provides for single stepping both the processor simulators one instruction at a time, and the hardware simulator any number of time units at a time.

The preferred embodiment environments provides, at user option, both a command line operating mode, and an interactive mode under a graphical user interface.

The Interface Functions

In the preferred embodiment, a library of functions is provided that span the hardware/software interface and that can be inserted into the user program to facilitate communication between the processor simulator and hardware simulator, and to affect synchronizations. These calls allow for information to be passed between the processor simulator and the hardware simulator, and include the translator when the information is passing to the hardware simulator, and the mapper when the information is passing from the hardware simulator to the processor simulator. That is, these functions are provided for inclusion in the user program, and some functions translate event information from the first data format of the processor simulator to the second data format of the hardware simulator, while some of the other functions, such as those dealing with asynchronous events, deal at least in part with translating a hardware variable in the second data format to the first data format of the processor simulator.

Thus, in general, the interface functions use the general callback mechanisms in the hardware simulator to implement a bi-directional flow of information and control between the hardware simulator and processor simulator. Some processor model shell functionality, for example, is carried out in Verilog using the programming language Interface (PLI) mechanism, and in VHDL using the foreign attribute mechanism, which works differently from the Verilog PLI. This translates a hardware signal variable in the is HDL environment to a software variable in the user program.

Thus, interface functions described herein form a software shell to provide the user program access to the processor signals coupled to the digital circuitry in the electronic system. Those interface functions are implemented in the Verilog version using the low level Verilog functions such as Verilog's 'tf' and 'acc' functions. These are difficult-to-use low level functions that allow for scheduling of events, etc., in Verilog. The preferred Verilog implementation of the invention is implemented using these functions to build software shell interface functions that are much easier to use in a higher-level language user program to provide access to the hardware simulation from the user program running on the processor simulator. For example, the Verilog environment has a general registration mechanism that allows a user to register a callback function (e.g., a 'C' function) that is associated with a hardware variable, that causes the function to be invoked whenever that variable changes state. The preferred embodiment implementation of the interface mechanism uses this general call back mechanism. For example, those interface functions that wait for hardware variable changes use these functions.

Note that while the interface functions are used in the invention for interactions between the hardware simulator and the processor simulator, a user can take advantage of the availability of these functions and use them in a hardware simulation to behaviorally simulate part of the digital circuitry.

When a user prepares a user program for simulation, the user may insert interface functions, for example, to get or update the state of input or output ports. Whenever the analyzer encounters a call to an interface function in the user program, it inserts a block boundary at that point, so that accurate timing up to the call is provided for the processor simulator.

The following is a sampling of interface functions that are provided in the particular preferred embodiment for inclusion in programs written in 'C.' Clearly different functions may be provided in different implementations, and certainly the form of any of these functions is not meant to be limiting. Other forms may be used.

The PutPort (vast_putport (int *)) and GetPort (vast_getport(int *)) interface functions cause the states of all other tasks including the hardware simulator to be brought up-to-date. PutPort then sends and Getport then receives updated value(s) of the given port buffer to and from the hardware simulator. GetPort receives the updated value. An example is the following code:

```
get_pixel_pli(int *datain, int *dataout, int *clk)
{
  . . .
  // write 0xFF to the port datain
  *datain=0xFF;
  vast_putport(datain);
  . . .
}
```

The waitEvent function (vast_waitevent(unsigned int *, unsigned int *)) waits for the occurrence of any event or time out on the given delay. The type of event that occurred is returned by the function with a returned delay time that has elapsed. The units of time specified are the system simulation time units (i.e., hardware simulator time).

The WaitDelay function (vast_waitdelay(unsigned int, unsigned int)) waits for the given delay time before resuming the execution of the calling task. This is actually similar to Wait Event call without waiting for any event change. One use of the WaitDelay function is for waiting a certain delay time that would be needed for some occurrence in the hardware simulator.

For example, if it is known that a signal takes 200 units in the hardware simulator, then rather than passing control to the hardware and then simulating the signal passing then returning to the processor simulator task, one simply can wait for the 200 units in the processor simulator.

The WaitPort function (vast_waitport (int *)) waits for the occurrence of a value change at the given port before continuing to execute the calling task. The value(s) of the given port buffer is updated in the hardware simulator and the first value of the port is returned by the function.

The GetTime function (vast_gettime( )) returns the current hardware simulator time, i.e., the system simulation time.

There also is a CreateRef function for creating a reference (void vast_createref (char *name)) to an HDL variable, such as a Verilog net, register, integer or real variable in the case of Verilog HDL. This is analogous to defining in the user program a memory location for some hardware register so that the GetVar and PutVar functions can be used like mapped memory input/output. While many search policies may be used, in one embodiment, the function starts searching from the module instance containing the call of the current user-defined system task to find the hardware variable with the specified name. If it fails to find the variable, then it goes one level higher to the ancestor module instance which contains the module instance containing the call of the current PLI task and so on to the top-level module until the variable is found. If successful, the function returns a reference in the form of a generic pointer which can be stored or assigned to a C pointer type appropriate for the hardware variable. The pointer can then be used to pass to the getvar or putvar functions (see below) to get the synchronized-time value(s) of the hardware variable or set the hardware variable with some specified value(s) at synchronized hardware/processor simulator time.

Once a reference is created, the WaitVar function (int vast_waitvar (void *varaddr)) is available that waits for a specified hardware variable to change its value. Similarly, functions for respectively retrieving (void vast_getvar (void *varaddr)) and writing to (void vast_putvar (void *varaddr)) a hardware processor variable are also provided.

The preferred embodiment also allows for inclusion of code such as debugging code that is interpreted by the analyzer as executing in zero time on the target processor.

Functions are also available for the handling of asynchronous events such as interrupts. One set function (vast_enablesynevent) enables asynchronous events, while another (vast_disablesynevent) disables all asynchronous events. A function is also provided for registering the handler program provided as an asynchronous event handler function. The asynchronous event handler function is called when an asynchronous event occurs. The registration function (vast_regasyneventhandler (*f)) accepts a function pointer pointing to the asynchronous event handler function.

Asynchronous events are described in more detail below. The preferred embodiment uses a special hardware variable asynevent. When set to 1, the asynchronous event handler function pointed to by the vast_regasyneventhandler ( ) will be called.

In the preferred Verilog implementation, the mechanism to cause a registered asynchronous event handler to operate on the processor simulator when asynevent is asserted in the hardware processor is implemented by using a Verilog callback mechanism. When asynevent changes state, the callback mechanism calls a function in the interface mechanism that checks the state of asynevent. Then, if asynevent is set, the interface mechanism sends a message to the hardware simulator to schedule an event to call the PLI associated with the processor simulator at the current (i.e., hardware) simulation time. The PLI when invoked will then call the registered asynchronous event handler.

The following example 'C' code is part of the Image_Filter 851 user program in the example of FIG. 8, to illustrate using the getport, gettime, and waitdelay functions

```
get_pixel_pli(int *datain, int *dataout, int *start)
{
  int c_data;
  . . .
  // get value from port datain
  c_data=vast_getport(datain);
  . . .
  // polling on a port start
  c_start=vast_getport(start);
  while (c_start !=1){
    printf("Still polling for start,
    time=%0dn", vast_gettime( ));
    // just add delay to reduce number of
```

Figure 7:
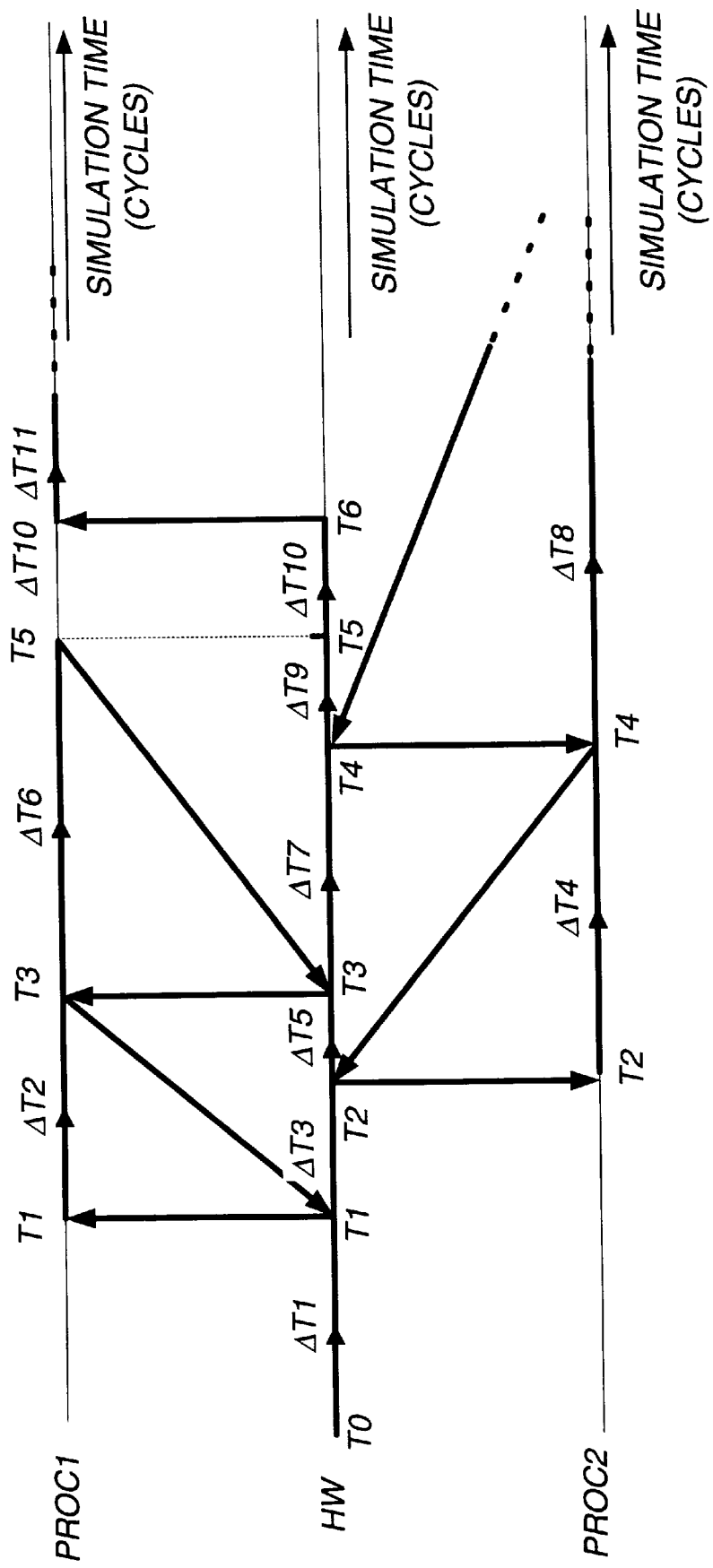
FIG. 7 shows a timing diagram of an example two-processor simulation according to an embodiment of the invention.

```
        // pollings, to increase simulation speed
        // This is speed-up optional and may be
    deleted
        vast_waitdelay(0, 10000);
        c_start=vast_getport(start);
    }
}
```
Timing and Asynchronous Events Typical operation will now be explained with the aid of FIG. 7 which shows an example of the timing of execution of a design system such as that of FIG. 2 including two processor simulators and the hardware simulator.

The hardware simulator provides the simulation time frame. Any units of time may be used, and clock cycles will be assumed to be the unit of time. Assume that the first task is some execution for a time ΔT1 until time T1. At this time, a start signal in the digital circuitry starts the processor simulator for processor 1. Processor 1 executes for a time ΔT2 until time T3 (measured in processor simulator 1's simulation time). Suppose at this point, processor simulator 1 encounters an interface function, such as a putvar function to send a signal to the digital circuitry. It now uses its communication mechanism to send the event information to the hardware simulator. This in turn causes the suspend mechanism 249 to suspend operation of processor simulator 207.

Note that while processor simulator 207 has consumed ΔT2 of simulation time, the hardware simulator 203 has hardly moved because the processor simulator executes so much faster than the hardware simulator on the host computer system. Thus when the information is communicated to the hardware simulator, it is still not far from time T1.

The hardware simulator 203 now processes the associated event information, which may be to determine a variable and return its value to processor 1 simulator 207 when it has executed the time delay ΔT2 at time T3. However, before reaching T3, after only ΔT3 of simulation time has been consumed, at T2 (<T3), a signal in the digital circuitry causes the second processor simulator (processor 2 simulator 208) to start executing. It processes for ΔT4 and encounters an interface function at time T4, at which time it send the information associated with the interface function encountering event (e.g., an input/output instruction) to the hardware simulator 203, which has not progressed much beyond T2.

The hardware simulator 203 now continues to execute, including processing the new event information, until it reaches time T3, at which time the processor simulator 207 task in the event queue of the interface mechanism causes the resume mechanism 251 to re-start the suspended process. Processor simulator 207 now processes for time ΔT6 at which time another significant event occurs. This significant event is to wait ΔT10 units of simulation time. One aspect of the invention is the capability of modeling processing to a selected level of accuracy, and in this instant, the user has selected to "behaviorally" model rather than accurately model hardware known to require ΔT10 units of simulation time to operate as a means of saving host computer simulation time. So the software task is now suspended and the interface mechanism returns to the hardware simulator not long after T3 in the hardware simulator's time frame.

Starting from T3, the hardware simulator executes until for ΔT7 until T4, at which time the second, suspended software task on processor 2 simulator 208 resumes for ΔT8 before returning to the hardware simulator. The hardware simulator now reaches T5, the time when the first processor simulator's operation was suspended (in hardware simulation time). Note that the hardware simulator does not pass control to the software task, but rather continues to process for the ΔT10 delay requested. That is, the event queue information on the processor 1 simulator is to restart at time T6. When hardware simulator 203 reaches T6, the processor 1 simulator 207 indeed resumes operation for ΔT11, and so forth.

Asynchronous Events

Whenever the hardware simulator 103 is operating, the system checks for any asynchronous events such as an interrupt. As described above under "Interface Functions", the preferred implementation provides for each processor simulator a mechanism to register asynchronous event handlers code associated with at least one hardware asynchronous event variable asynevent. When there is an asynchronous event, the processor simulator is invoked and the asynchronous event handler code is executed. At the end of execution, the control is returned to the hardware simulator.

Figure 9A:
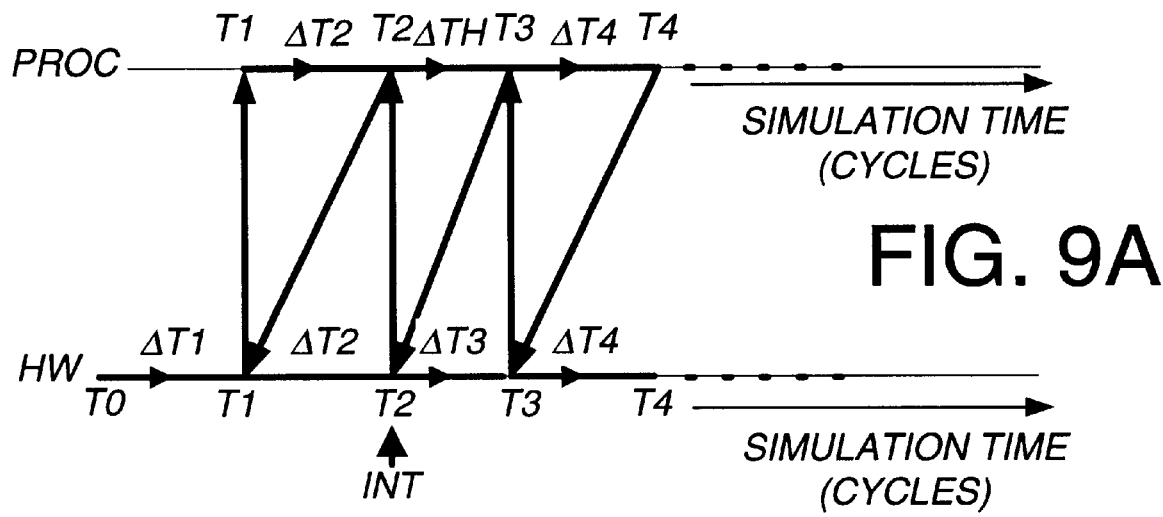
FIGS. 9A, 9A and 9C show timing diagrams of different asynchronous event sequences.

FIG. 9A shows the normal chain of events for a single processor design system such as that of FIG. 1. Suppose an interrupt occurs at some time T2, after the processor simulator has executed for a delay time ΔT2. At T2, the processor simulator passed associated event information, including the ΔT2 delay, to the hardware simulator 103, and hardware simulator 103 executed for ΔT2 time units until the interrupt occurrence at T2. At this time, the hardware simulator asserts hardware variable asynevent to simulate an interrupt. This causes the processor simulator 107 to execute an interrupt handler, which, for example, takes ΔTH time units. At this point, the processor simulator returns to the hardware simulator 103.

Figure 9B:
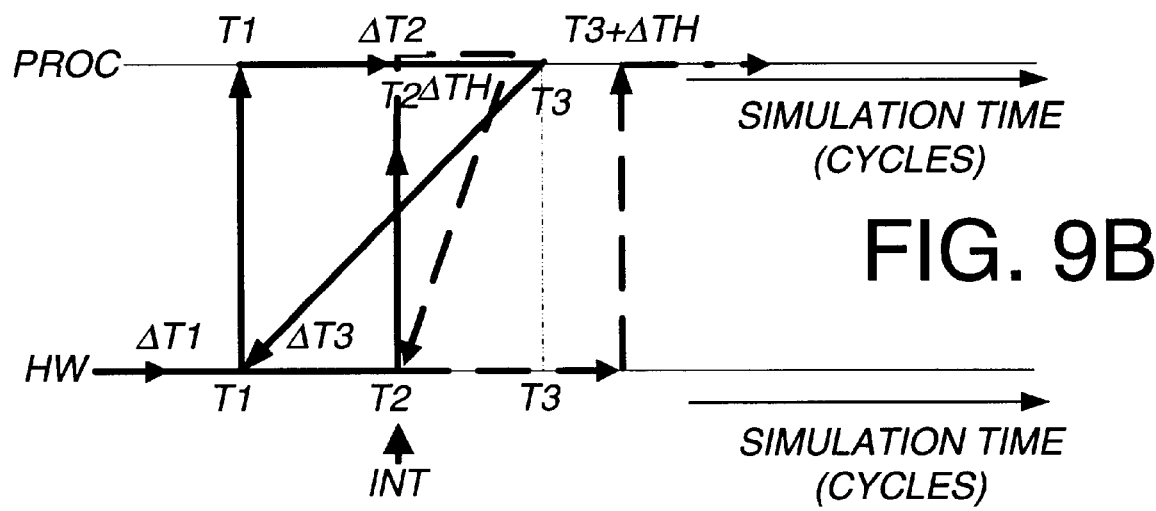

Because the processor simulator typically executes much faster in the host computer system than the hardware simulator, it may be that causality is no longer maintained. This is shown in the example of FIG. 9B. A processor simulator task starts at T1 and runs for a delay of ΔT2 until time T3. Processor simulator 107 is now suspended and hardware simulator 103 starts processing the accumulated delay of ΔT2. However, an interrupt occurs at time T2 after only ΔT3 of the delay has been consumed (ΔT3<ΔT2). The processor simulator wants to now run the handler code. However, the processor simulator is already at T3 ahead of T2.

The preferred embodiment provides for several solutions for dealing with a potential violation of causality. One technique is to allow the violation, but not allow the interrupt handler and the part of the user program running during the ΔT2 to share variables. That is, the user examines the user program, during program preparation or later, to ensure that the interrupt handler part of the user program does not share variables with any other parts. With this restriction, no complications will occur. To account for the overlapping time in executions, the interface mechanism is programmed to correctly schedule the resumption of the processor simulator after the interrupt handler completes. Thus, referring again to FIG. 9B, the processing after the interrupt is shown in a heavy dashed line. When the interrupt occurs at T2, the interrupt handler starts processing for ΔTH units of time, and then stops, and returns to the hardware simulator. Prior to the interrupt, the hardware simulator was scheduled to restart the processor simulator after ΔT2 units of processing time. Now an additional ATH is added to the schedule, so that the processor simulator resumes operation not at T3, but rather at T3+ΔTH.

Figure 9C:
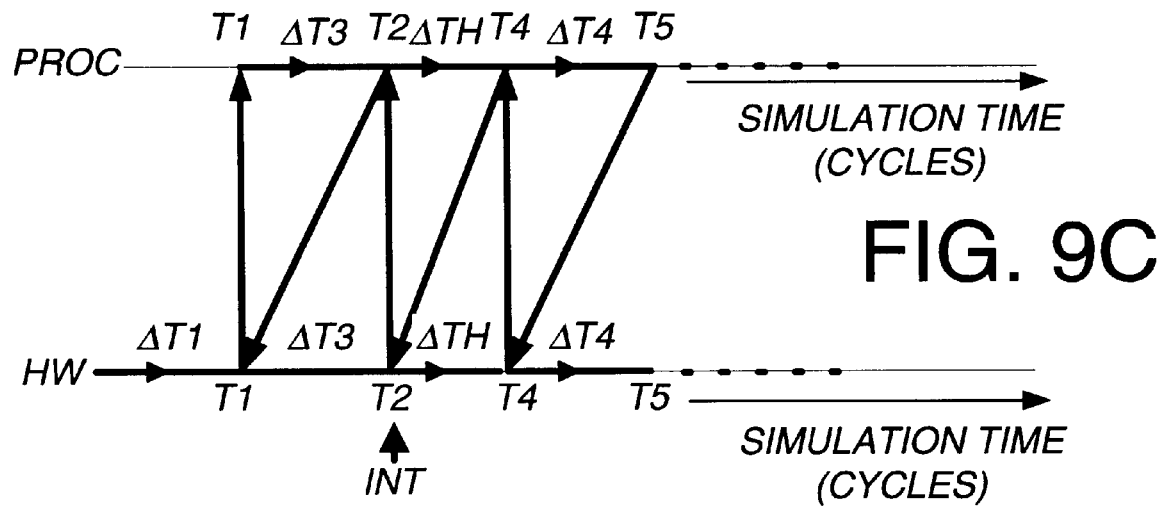

The other solutions for dealing with a potential violation of causality is to avoid the violation or the consequences of a violation. The first such solution is to insert code in the user program that forces more block boundaries so that the interrupt will be directly picked up. The second is to insert an interface function that will cause the processor simulator to suspend operation at T2, and then rerun the simulation. This second solution is illustrated in FIG. 9C, where at time T2, the interrupt occurs in the hardware simulator, which causes the processor simulator 107 to run the interrupt handler for time ΔTH to time T4, at which time the processor simulator passes the delay to the hardware simulator 103 which processed ΔTH of time. The processor simulator 107 now resumes operation of the previous code for another ΔT4, where ΔT2 from FIG. 9B equals ΔT3+ΔT4.

The third procedure for avoiding causality violation consequences is not to allow any processor simulator to run ahead of the hardware simulator by more than some predetermined amount of time. That is, time delay information is forwarded to the hardware simulator when no event information has been conveyed to the hardware simulator within this predetermined amount of time. By selecting the predetermined amount of time to be the minimum propagation delay of an interrupt through the digital circuitry, the user is assured that causality will not be violated.

The fourth procedure for avoiding causality violation problems is to note that typically only some of the variables (e.g., global variables) are shared between the interrupt handler and other parts of the user program. According to this fourth procedure, these global variables are registered as hardware variables and the user program analyzed by the user. Code is manually or automatically inserted before any access to these global variables such that the processor simulator is suspended until the hardware simulator has caught up in simulation time. For example, the use can insert a GetVar or other interface function whenever access to these variables is made in the user program.

Analysis of the User Program

Detailed operation of the analysis process (performed by a program called VPMA) is now described. The static analysis of a user 'C' program is carried out with reference to the particular virtual processor model. The virtual processor model includes a file of parameters for the particular target processor, and contains, for example, the number of stages in the instruction pipeline of the target processor, data on instruction timing, information on how to parse instructions on the assembly language of the processor, and other components used by the static analysis process. The part of the virtual processor model used by the analyzer is called target processor specific information herein.

The user 'C' program to be analyzed is preferably available in the form of a file that includes a set of 'C' functions. The result of the analysis is an object code of an analyzed 'C' program that when run on the host processor provides timing information that considers pipeline effects such as pipeline hazards.

Figure 3A:
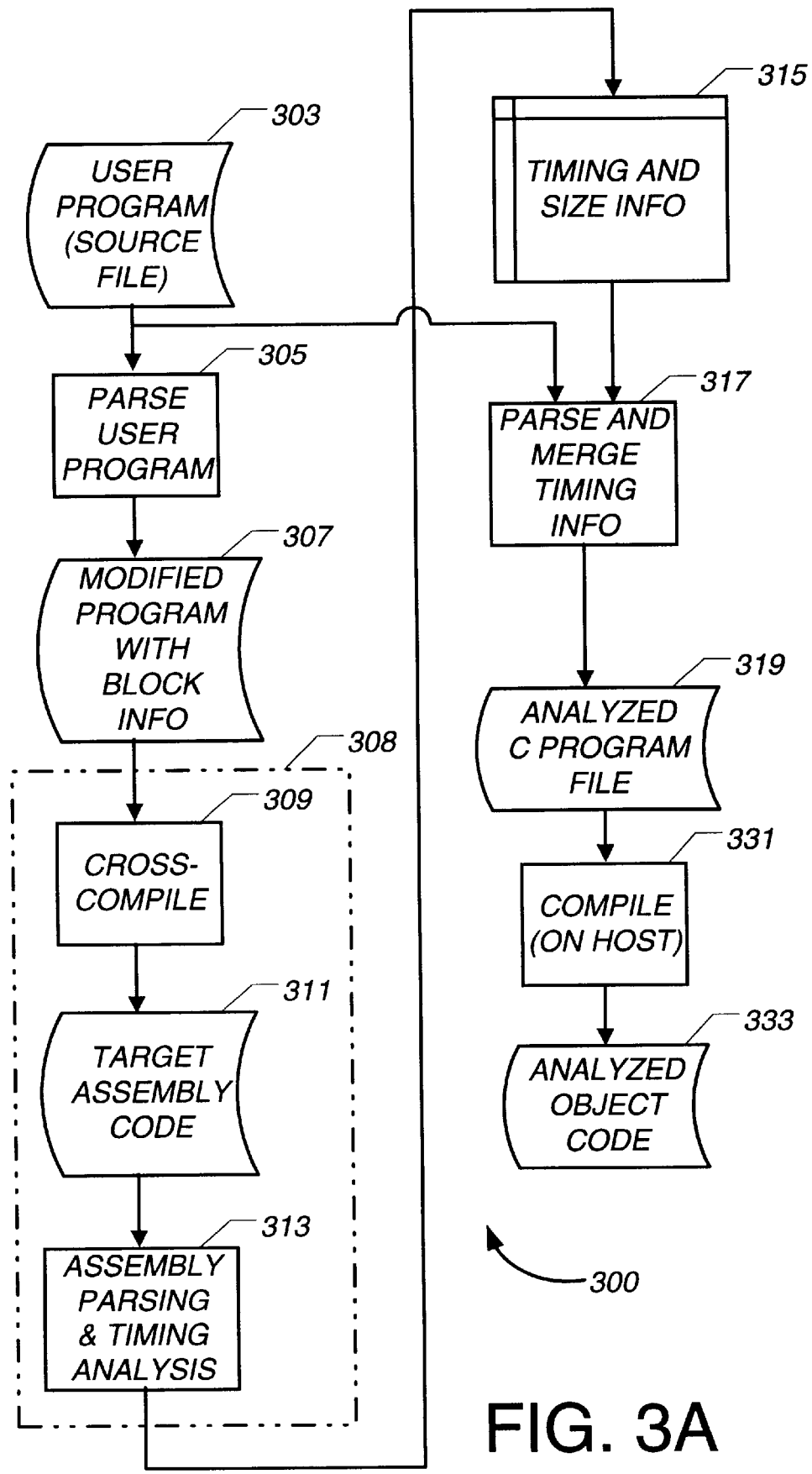
FIG. 3A shows a flow chart of the user code analysis according to an embodiment of the invention.
Figure 3B:
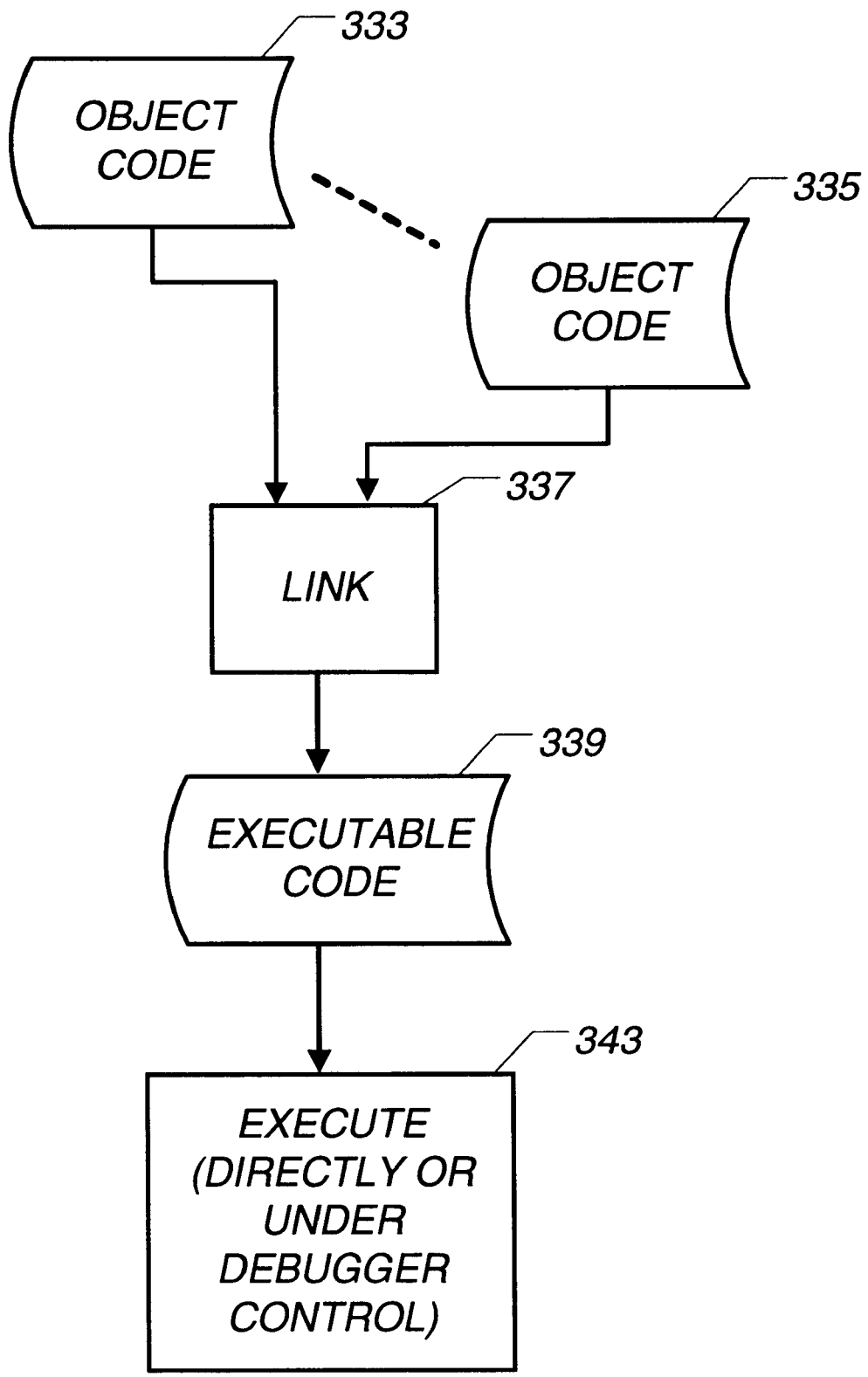
FIG. 3B shows a flow chart of linking several analyzed modules according to an embodiment of the invention.

FIG. 3A shows a flow chart of the static analysis process 300, and FIG. 3B shows by flow chart how the information produced by the analysis process is used. Referring first to FIG. 3A, the first step of static analysis process 300 is decomposing the user program into linear blocks. The particular embodiment for analyzing a 'C' program includes parsing the user 'C' program 303 to determine the linear blocks. This uses a first 'C'-language user program parser 305 which searches for the language constructs that identify the beginning and end of such linear blocks, and places start and end block information in these locations. In particular, first user program parser 305 places labels at the beginning of each linear block. The result of this step is a modified 'C' program file 307 with block information.

Note that normally, linear block boundaries are natural constructs in a language such as C, and analyzing the program block by block to determine timing information allows the analyzed program to run fast on the host processor. To provide for accurate timing calculations at the beginning and end of a multi-instruction linear block, linear blocks may be defined to be as short as a single instruction. In such a case, the analyzed program would run more slowly on the host computer system, but executing such a finely analyzed program, when required, would produce accurate timing information.

The next step in the analysis is determining the time delay for each linear block of the user using characteristics of the target processor. This is shown in the flow chart of FIG. 3A as set blocks 308. Each step in the time delay determining process 308 is now discussed for the preferred embodiment case of the user program including code in some higher-level language such as 'C.' Alternate higher-level language embodiments might include 'C++' statements in the user program, or statements in some other programming language.

The first step in 308, shown as 309, is cross compilation on the host processor of the modified user program file 307 into the assembly language of the target processor. This produces a target assembly code file 311, with the labels that were inserted in the first user program parsing step 305 remaining intact in the assembly code file 311.

The next step shown as 313 includes parsing the assembly language of file 311 line by line to determine the time delay in clock cycles required for each line, and the size in bytes of target code of each line. Simultaneously, a timing analysis process (also in step 313) is started. The assembler parsing process of step 313 communicates with the timing analysis process of step 313 via a communications channel to pass timing information, including adjustments for pipeline effects, to the timing analysis process.

The result of the assembly parsing the timing analysis step 313 is a set of timings for each linear block in the 'C' code. A set of sizes of each blocks also is produced. The timing and size information of the blocks is shown as 315 in the flow chart of FIG. 3A.

The analyzer in step 317 now combines the linear block timing information with the user program to determine the timing information for the processor simulator. Step 317 includes parsing the original 'C' language user program file 303, using a second 'C' language user program parser. Step 317 also includes inserting timing code statements in the 'C'-code, the insertion using timing information 315. Other code also may be inserted in step 317 for other purposes, such as dynamic analysis. The result of parsing and timing information merging step 317 is an analyzed 'C' program file 319 that includes timing information, which incorporates pipeline effects. The analyzed 'C' program file 319 is compiled (step 331) on the host processor to run on the host processor. The output is host processor analyzed object code 333.

Referring now to FIG. 3B, the analyzed object code 333 is linked in linking step 337 with other analyzed object code modules, one such other object code module shown 335 in FIG. 3B, to produce executable code 339. This executable code is run (step 343) by the designer on the host processor to simulate the execution of the user 'C' program on the target processor.

Note that in one embodiment, the simulation execution step 343 is carried out not under debugger control, while in the preferred embodiment, the simulation execution step 343 is carried out under debugger control as explained elsewhere in the specification. In the preferred embodiment, line numbers are preserved during the analysis process, even though new code is inserted, by inserting the new code without inserting any new-line characters. Other mechanisms may be used to preserve line numbers, and alternatively, line re-mapping data may be kept for use during execution of the user program on the host processor under debugger control.

The preferred embodiment analysis steps of FIG. 3A will now be described in more detail.

The First 'C' Parser

The first user program parsing step 305 identifies linear blocks in the 'C' language user program file and inserts labels. The preferred embodiment uses 'C'-language aimed at the GCC compiler from Free Software Foundation, Boston, Mass., ("GCC" for "GNU 'C' Compiler", "GNU" for "Gnu's Not Unix"). GCC includes extensions of 'C'. Labels are inserted using one such extension, the asm ("<string>") construct, where <string> is an alphanumeric label, to inset the labels. This way, the labels will be identified as labels in any assembly code resulting from compilation. The parser defines and maintains a block counter. This counter commences at 0 at the beginning of the file when the first block beginning is identified, and increments when certain linear block boundaries are encountered.

The first user program parser 305 inserts three different types of labels (each including its block number) for each construct. These labels use the letters b, p and e to respectively indicate "begin", "part" and "end". The first user program parser 305 inserts a b (i.e., "begin") label for the assembler language before the 'C' language statement that identifies the construct, an e (i.e., "end") label after the 'C' statement that identifies the end of the construct (usually "}" indicates the end of the construct), and one or more p (i.e., "part") labels.

The parser also identifies the type of block construct, and what number of block this is. For example, the parser 305 identifies a while construct block with the letter w for while. In addition, "X_" is inserted at the beginning of each inserted label to enable the system to distinguish labels it inserts from other labels. Therefore, prior to a while statement, the label X_wbn_1 (using the asm ("X_wbn_1") statement) is inserted, where $n\_1$ is the current value of the block counter. After the end (usually the final "}" of the while loop, the label X_wen_2 is inserted, where $n\_2$ is the now current value of the block counter. $n\_2$ will be equal to $n\_1+1$ if there are no block constructs in the body of the while loop. In addition, after the beginning "{" of the block of statements executed in the body of the while loop, a X_wpn_1 label is inserted, where $n\_1$ is now the same block count number as in the X_wbn_1 label that indicates the beginning of the loop.

The parser 305 identifies and inserts labels in 'C' constructs that indicate different types of linear blocks, as follows:

While Loops

Suppose the 'C' file includes while (wexpression)
   {
      wbody
   } where wbody is the set of one or more 'C' statements that are executed if wexpression is true. The output of the first 'C' parsing step includes the following 'C' program segment with the labels identifying the blocks: If $n\_1$ is the value of the block counter before the while loop, and the total number of blocks in wbody is $n\_w$, then the code in the modified 'C' file includes asm ("X_wbn_1");
   while (wexpression)
   {
      asm ("X_wpn_1");
      wbody
   }
   asm ("X_wen_2");

where $n\_2=n\_1+n\_w$. For example, if wbody consists of a single simple 'C' statement, then $n\_2=n\_1+1$.

Do-while Loops

Suppose the 'C' file includes do
   {
      dbody
   }
   while (dexpression);

where dbody is the set of one or more 'C' statements that are executed while wexpression is true. If $n\_1$ is the value of the block counter before the do loop, and the total number of blocks in dbody is $n\_d$, then the code in the modified 'C' file includes asm ("X_dbn_1");
   do
   {
      asm ("X_dpn_1");
      dbody
   }
   while (dexpression);
   asm ("X_den_2");

where $n\_2=n\_1+n\_d$.

For Loops;

Suppose the 'C' file includes for (fexpression1; fexpression2; fexpression3)
   {
      fbody
   } where fbody is the set of one or more 'C' statements that are executed while fexpression2 is true. If $n\_1$ is the value of the block counter before the for loop, and the total number of blocks in fbody is $n\_f$, then the code in the modified 'C' file includes asm ("X_fbn_1");
   for (fexpression1; fexpression2; fexpression3)
   {
      asm ("X_dpn_1");
      fbody
   }
   asm ("X_fen_2");

where $n\_2=n\_1+n\_f$.

If and If-else Statements

Suppose the 'C' file includes if (iexpression)
   {
      ibody
   }
   else
   {
      elsebody
   } where ifbody and elsebody are the 'C' statements that are executed if iexpression is nonzero (true) or zero (not true), respectively. The output of the parsing step is a temporary file that includes the following 'C' program segment with the labels identifying the blocks:

```
asm ("X_ibn_1");
if (expression)
{
    asm ("X_ipn_3");
    ibody
}
else
{
    asm ("X_ipn_4");
    elsebody;
}
asm ("X_ien_2");
``` where n_3=n_1+1, n_4=n_1+n_i, and n_2=n_1+n_i+n_e, where n_i and n_e are the number of blocks in ibody and elsebody, respectively.

Switch-case Statements

Switch statements are treated similarly to if-else statements, except that a new begin part ("X_spN") label is added each time a new case or the default is encountered.

Plain Blocks

Plain blocks are identified by"{" and "}" that are not associated with any loop. Only the begin and the end labels are added. The first 'C' parser does not add a X_bpn (part) label. Thus, a user can force the parser to recognize block boundaries by manually inserting a "{" and "}". This adds an important advantage to the system—a linear block can be as short as a single instruction, and the user has the option of so analyzing the code to get instruction-by-instruction timing.

The parser also forces a boundary whenever it encounters statements that require software/hardware interaction and synchronization between input and output, such as I/O reads, and functions inserted by the user to implement virtual ports, described elsewhere herein, and other functions recognized as dealing with the interface mechanism, for example to pass control messages between the processor simulator and the hardware simulator. These functions are called "synchronized interface mechanism functions" herein and include many of the interface functions described herein above. The parser forces accurate timing to be made available whenever a synchronized interface mechanism function is encountered. In one embodiment, the synchronized interface mechanism function is surrounded by "{" and "}" characters. In the preferred embodiment, each synchronized interface mechanism function is recognized by its name. When encountered, the function is treated as a block.

The parser also keeps a count of the total number of blocks and the total number of functions in the 'C' language file. The number of blocks is the final value of the incremented block counter.

The output of the first 'C' language parsing step is a temporary 'C' language file 307 which is the modified user program with the block information inserted.

The Cross Compilation Step

The next step in the analysis of the 'C' program is cross-compilation step 309 which cross compiles the temporary 'C' language file 307 to generate a target assembly code file 311 corresponding to the 'C' user program, but with the labels that were applied in the parsing step 305 incorporated. For this, a compiler("cross-compiler") that generates assembly language for the target processor is run on the host processor. Note that each different type of processor needs its own cross-compiler, so when a virtual processor model is selected, the particular cross compiler to use in analysis also is specified. Which cross-compiler to use is thus part of the target processor specific information.

The output of the cross compilation step is an assembly language file 311 which includes lines of target assembly code with the labels that were inserted in the 'C' program parsing step.

Assembly Language Parsing

Figure 4:
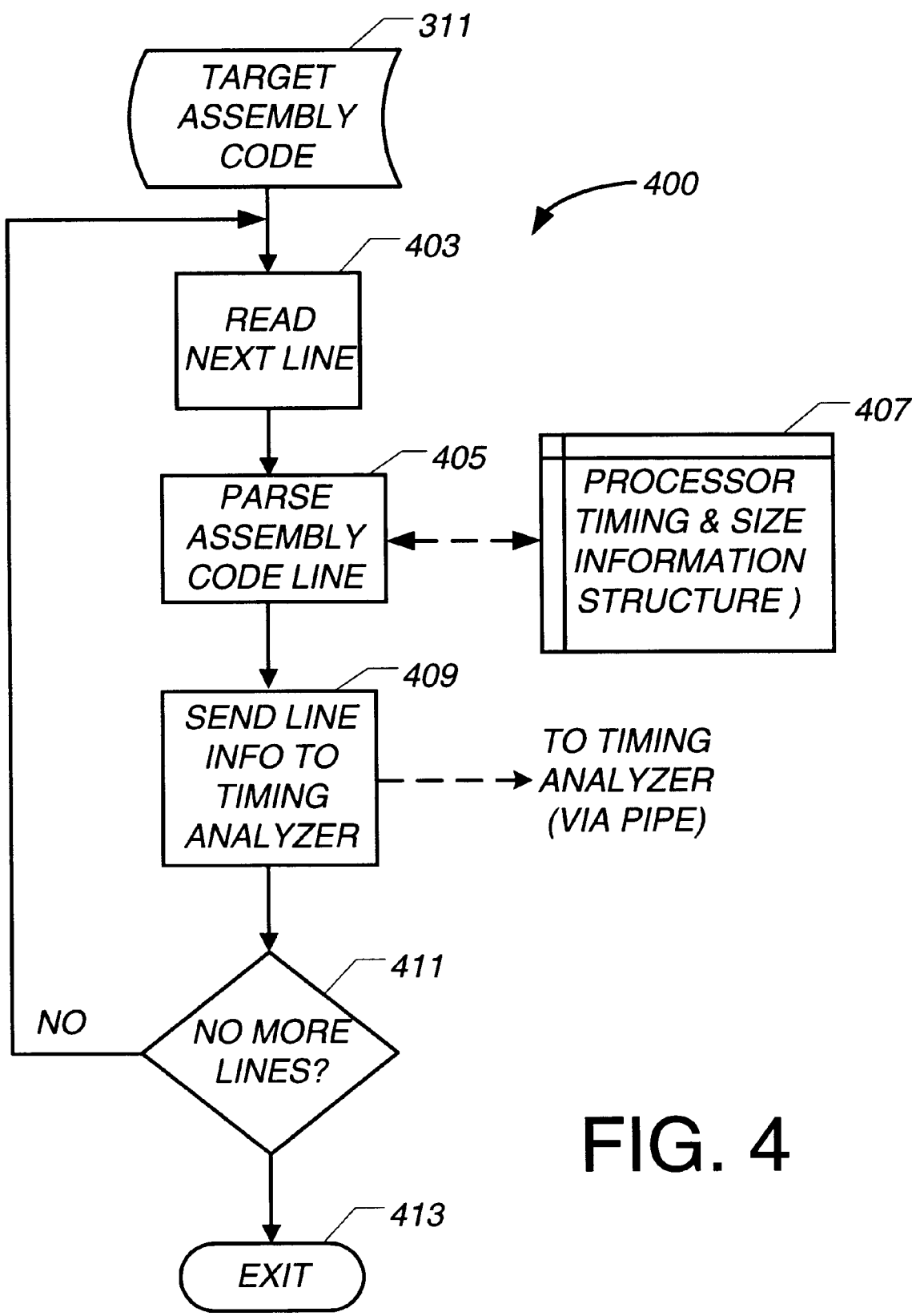
FIG. 4 shows a flow chart of an assembly code parsing step for inclusion in an analysis process according to an embodiment of the invention.

The analyzer now starts the assembly parsing and timing analysis step 313. The assembly parsing process part is explained with the help of FIG. 4, FIG. 5 and FIG. 6. Referring first to FIG. 4, assembly parser 400 in step 403 reads each of the lines of the cross-compiled assembly code file 311, then parses, in line parsing step 405, the instruction of the assembly code line to determine the timing delay (if any) and the size of the instruction (in bytes). The timing delay is the delay, in clock cycles, that it takes for the target processor to execute the line of assembly code.

Figure 6:
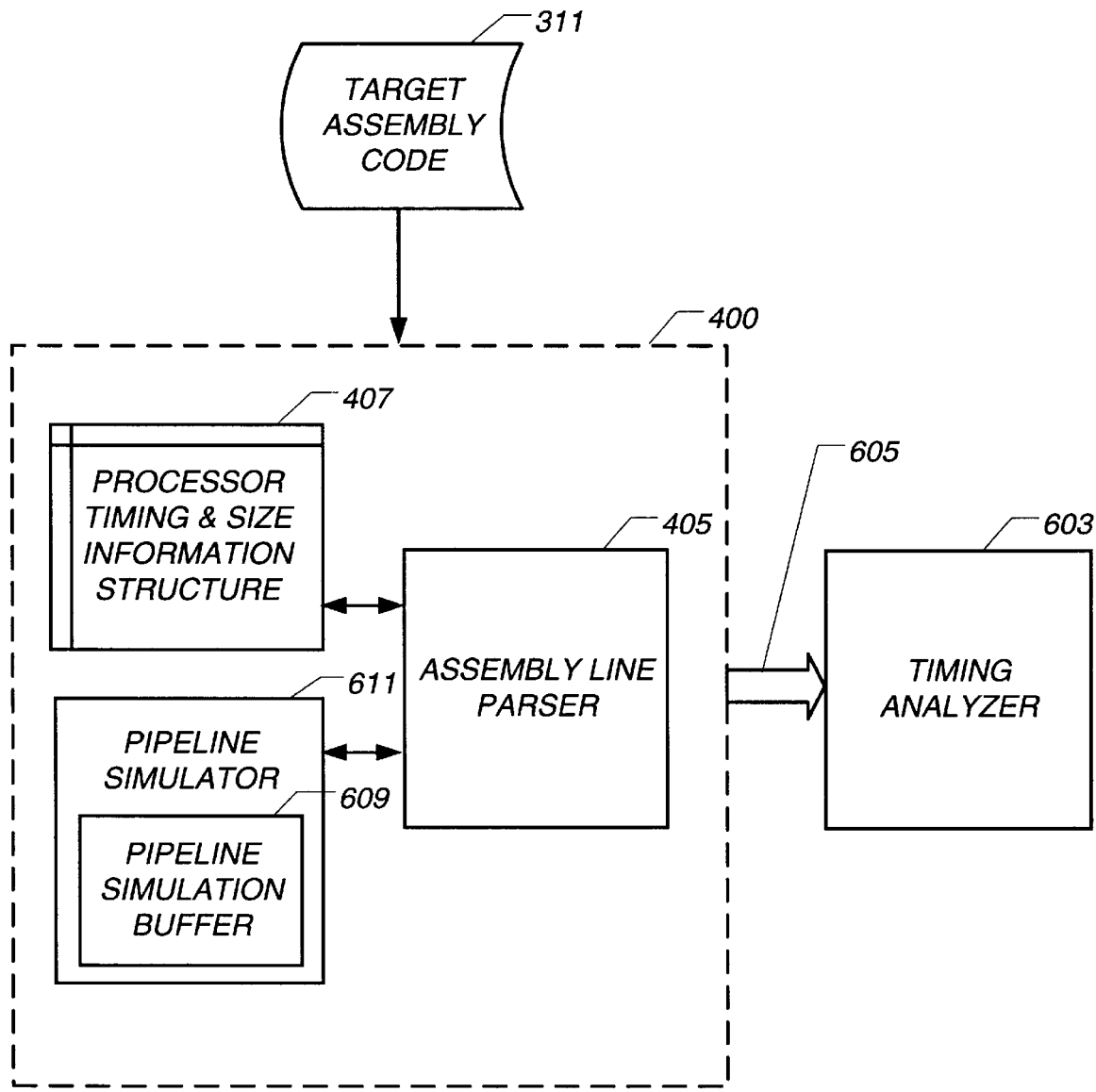
FIG. 6 shows a timing analyzer process communicating with assembly code parser according to an embodiment of the invention.

As shown in FIG. 6, the parsing and timing analysis step 313 also includes running timing analysis code (the "timing analyzer" 603) which is described in more detail below. In the particular embodiment, parsing process 400 is started by the analyzer, and then 300 analyzer commences the timing analysis process 603 which communicates with assembly parser 400 through a pipe 605, and any alternate means of communication may be used in alternate implementations. Every time an assembly line parser 405 of assembly parser 400 completes parsing a line, it sends back information related to the line to timing analyzer 603 in step 409. The line information includes the time delay and any other timing information for the line and the size of the line, if an instruction, or, if a label, the name of the label. A token is used to identify the type of information as described in more detail below. The type of token also tells the timing analyzer what information to expect in the pipe for the line.

In the preferred embodiment, the assembly line parser 405 and the data it used are part of the Virtual Processor Model (VPM). The assembly line parser sometimes is called the technology parser. This part is not common to all processors, but is specific to the target processor, and thus forms part of the target processor specific information of the virtual processor model. In the preferred embodiment, a configuration file naming an executable parser is used when specifying the virtual processor model in a design to be simulated.

The assembly parser uses target processor timing information 407, i.e., information about the target processor that includes the time in clock cycles for each instruction and for the different addressing modes. In general, the timing for any instruction is determined by the opcode of the instruction, the operands the instruction is using, the type of addressing, and other such information. In the preferred embodiment, the designer of the virtual processor model manually extracts timing information from available data on the particular target processor. Such data includes the manufacturer's data book and may also include manufacturer's or other's models and other timing and functional information. The timing information is stored the timing information in a timing information data structure. A tabular structure is preferably used as the data structure, with each row structure representing an instruction, and each column structure representing different addressing modes or other variants of the instructions. In the preferred embodiment, the individual instruction timing in the timing information table assumes a full pipeline and no pipeline hazards.

The timing information also forms part of the processor specific information in the virtual processor model.

Figure 5:
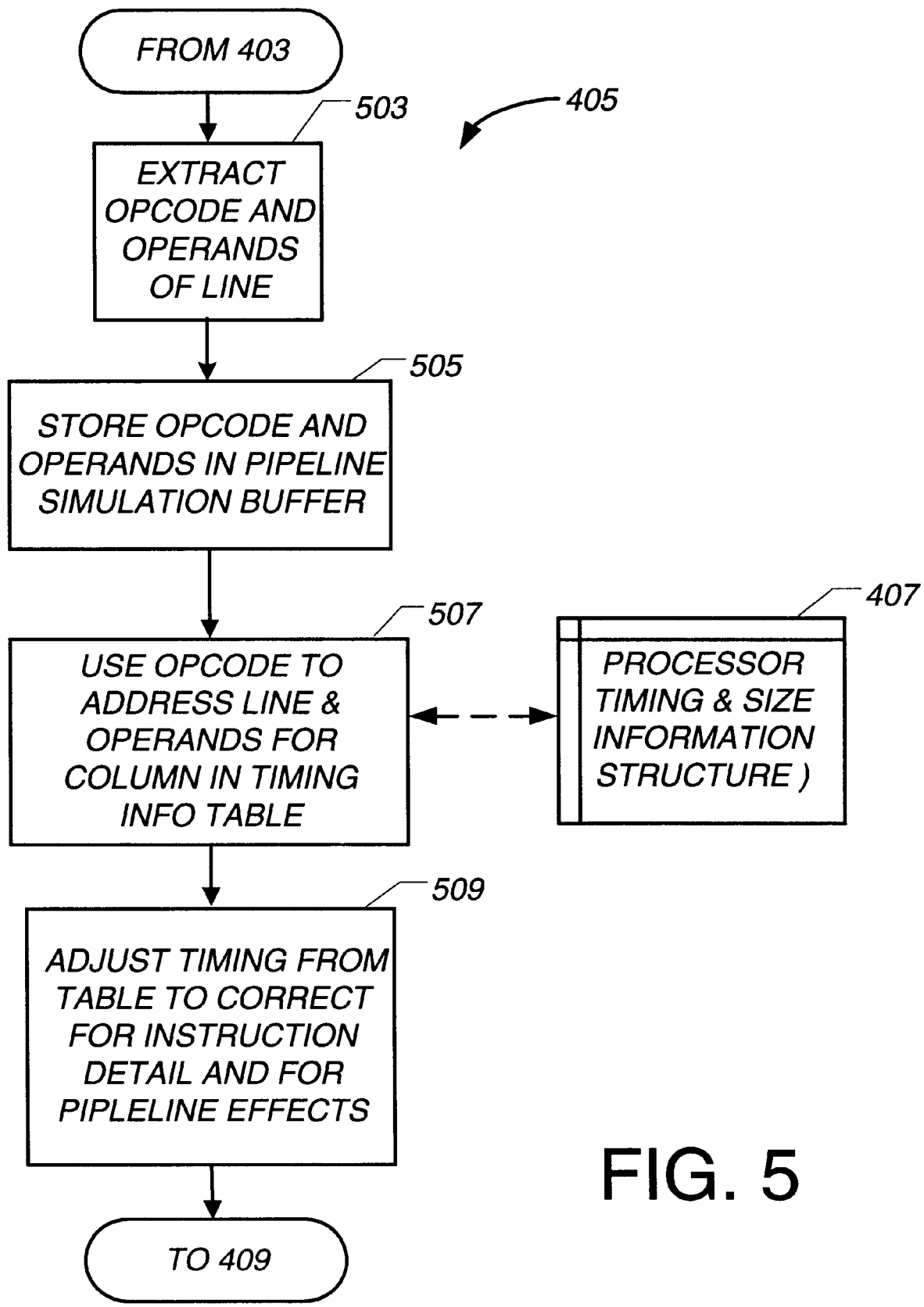
FIG. 5 shows a flow chart of the single line parsing step according to an embodiment of the invention.

The details of assembly line parsing step 405 are shown in FIG. 5. In step 503, the assembly line parser 405 first extracts the opcode of any assembly language instruction in the line and uses the opcode in step 507 to address the line of the table. As the parsing of the line progresses in step 503, more information on the operands is extracted from the assembly language line, and this is used to determine the column in step 507. The row and column provide the timing information for the assembly code line from the timing information table structure 407.

Timing information data structure 407 (i.e., the table structure) is preferably compressed. The compression is explained by way of example, in particular, the instruction set of the well known Motorola 68000 family of microprocessors. The 68000 instruction set uses so many different addressing modes, that if one column was used for each mode, a very large table would be required. Instead, in the preferred embodiment, a smaller number of columns is used for the 68000 family, with some of the column entries defining classes of addressing, e.g., that the operand is a register. Similarly, the number of rows is reduced. The instructions of the vast majority of microprocessors fall into classes that only vary slightly in the timing and sequence of operations. In order to reduce the number of rows used in the timing information table, the instruction set is divided into subsets, and one row is used for each subset.

Those is the art will appreciate that other data structure may alternatively be used for storing the timing information, such other structures including lists, trees, and sequences, and how to modify the embodiment to incorporate using such structures would be straightforward to those practitioners.

Once the timing information is obtained in step 507 by a table lookup on the compressed table 407, the line parser 405 calls an adjustment process 509, which in the particular computer program implementing this step in the preferred embodiment, is a function called "lookup". The function lookup returns any timing delay adjustment (in cycles) necessary for the specific instruction to the timing obtained via the table lookup.

Using the Motorola 68000 family again as a example, the JSR and JMP instructions have similar timings, so these are referenced to the same row of table 407. They support the same addressing modes but each consume different time in an addressing mode. So after the table lookup step 507 of parsing step 405, the function lookup is used to make an adjustment to the timing in adjustment step 509.

Another aspect of the adjustment process 509 is adjusting the timing to account for pipeline effects as described in more detail herein under.

Steps 403, 405 and 409 are carried out for each line. FIG. 4 shows step 411 checking if there are more lines to process. If not, the assembly code parsing process 400 terminates, otherwise, steps 403, 405 and 409 are repeated until there are no more lines in target assembly code file 311.

Pipeline effects

An important aspect of the invention is accounting for pipeline effects such as pipeline hazards. In addition to the assembly parser 400 obtaining timing information by referencing the timing information table 407, the assembly line parser 405 determines any timing adjustments that need to be made and which instruction's timing needs to be adjusted because of pipeline effects. This determination is made as part of adjustment step 509. The information in timing information table 407 assumes a full pipeline and no pipeline hazard effects. As shown in FIG. 6. the assembly parser 400 includes a pipeline simulator 611 that preferably comprises a pipeline simulation buffer 609 with the same number of entries as there are stages in the pipeline of the target processor. Thus, the virtual processor model includes code to set up a pipeline simulator including buffer 609 whose length is at least the same as the number of stages in the pipeline. Every time the assembly line parser 405 encounters an opcode or operand, it stores the opcode or operand in the pipeline simulator buffer. This is shown as step 505 in FIG. 5.

When the lookup routine called lookup (step 509) is invoked for making adjustments to the timing, it adjusts the timing obtained from the timing information table according to the particular instruction and addressing mode and operand, and also checks the contents of the pipeline buffer 609 for possible pipeline hazard conditions. Because the opcodes and operands and any other related information for this and previous instructions are stored in the pipeline model, the lookup function identifies the potential for pipeline stalls and actual stall conditions, and calculates the delay penalty for such a stall, and which instruction would incur such delay penalty. This determination is made using the data on how the target processor pipeline operates, obtained from the manufacturer's (or other) specifications and models for the target processor. The lookup function returns the adjustment (called the "amendment") required for the timing and also information to indicate which instruction to apply the amendment to. The instruction information is supplied as an offset: a digit indicating how many instructions back to apply to amendment to. For example, the previous instruction is indicated by a 1, two back by a 2, and so forth.

Thus, in the preferred embodiment, the lookup function including the pipeline specification also forms part of the processor specific information in the virtual processor model.

Note that in the preferred embodiment, the timing analyzer and the assembly parser do not share data but communicate via the pipe. Thus, when the assembly parser sets up the pipeline simulation buffer 609, it also sends information to the timing analyzer for it to set up a buffer of the same size. The analyzer buffer is needed for the timing analyzer to make adjustments to instructions that may no longer be in the same linear block.

In addition, in the case that an adjustment to the timing of the present instruction is required from what was obtained from the timing information table 407, the lookup function (step 509) provides an amount by which to modify the present instruction timing. In such a case, the assembly line parser 405 adjusts the timing in step 509 according to the result of the lookup function call.

Analyzing the pipeline simulation buffer for hazards and determining penalties, if any, is different for each type of processor. The target processor manufacturer publishes details on the pipeline processing, builds models having the pipeline characteristics, and such information is used to design the pipeline analysis part of function lookup. How to so design the pipeline analysis part of timing adjustment step 509 using manufacturer's (or other) data and models would be clear to those in the art from the examples and discussion herein.

A typical pipeline contains several stages. For example, a simple modern pipeline may have the following 5 stages: instruction fetch (IF), instruction decode (ID), execute (EX), memory access (MEM) and write back (WB). The MIPS R4000 processor (Silicon Graphics, Inc., Mountain View, Calif.), on the other hand, has eight pipeline stages.

There are three major types of pipeline hazards. Structural hazards occur because instructions that are overlapped in execution may require processor resources simultaneously.

For example, an instruction may be writing data to memory while another is being fetched for execution, thus possibly needing memory access resources simultaneously (load/store hazard), depending on the particular processor. In the preferred embodiment, the function lookup examines the contents of the pipeline simulation buffer and detects such conditions. When such a condition is detected, function lookup adjusts the timing of all affected instructions and then the assembly analyzer passes this information to the timing analyzer. Which instructions are affected and by how much the delay is adjusted depends on the particular pipeline stalls implemented in the processor.

Another type of common hazard is the data hazard, which occurs when one instruction is dependent on a preceding instruction, and the dependency cannot be satisfied because the instructions overlap in the pipe. One example is a read after write hazard. Consider the two sequential instruction

ADD R1, R2, R3

ADD R4, R5, R1 where the syntax for such instructions is

OP DEST, SRC1, SRC2.

The first ADD instruction writes its results to register R1 and the next ADD instruction wants to read from register R1, but cannot do so until the first instruction finishes its WB stage. Write After Read and Write After Write hazards similarly are known. However, some target processors can tolerate these data dependencies. That is, what may cause a data hazard in the pipeline of one particular processor may not cause a hazard in another processor because that other processor's design is tolerant of such dependencies. For example, bypass circuits may be included in the pipeline so that such read/write hazards are eliminated. As another example, to allow instructions to execute out-of-order, registers specified in operands of instructions in some processors are dynamically renamed to prevent write-after-read and write-after-write conflicts. This renaming is accomplished by mapping architectural or "virtual" registers to physical registers. Thus, two instructions that write the same virtual register can safely execute out-of-order because they will write to different physical registers, and consumers of the virtual registers will get the proper values.

In the preferred embodiment, the function lookup examines the contents of the pipeline simulation buffer and detects such conditions. When such a condition is detected, function lookup adjusts the timing of all affected instructions. Which instructions are affected and by how much the delay is adjusted depend on the particular pipeline stalls implemented in the processor.

The third type of hazard is a control hazard that occurs when a branch or jump is executed. The instructions fetched prior to knowing where the branch takes one may be useless. Some processors includes hardware that enables determining the branch address and condition in the ID stage, and thus result in only a single cycle delay. In the preferred embodiment, any control hazards lead to an adjustment, depending on the particular processor.

The invention may be applied to different types of target processors having different types and numbers of pipelines by modifying the pipeline simulator. For example, a target processor with a superscalar architecture that can process more than one instruction per clock cycle might include a pre-fetch buffer, and such a pre-fetch buffer would then be simulated as part of the pipeline simulator. Similarly, the target processor may have a superpipeline architecture with several pipelines, and in such a case, the pipeline simulator would include simulating several pipelines.

The Timing Analyzer

Referring again to FIG. 6, the assembly parser 400 passes tokens and data to the timing analyzer 603 via a pipe 605. Clearly any other communication channel may be used. Different types of tokens are used to indicate different types of information, and the type of token identifies to timing analyzer 605 the type and amount of information that follows.

The preferred embodiment uses the types of tokens shown below in Table 1.

TABLE 1

| Token | First Parameter | Next Parameter (if any) | Description |
|---|---|---|---|
| newline | delay | size | the token for a normal instruction |
| label | name of label | | the token for a label |
| return | delay | size | indicates this is a return of a subroutine, which may lead to pipeline flush |
| error | string for the error condition | | an error was encountered |
| EOF | | | End of File was encountered, and the pipe needs to be closed |
| amend | which instruction to amend (a number) | delay adjustment | an amendment required, for example because of a hazard |
| set buffer | buffer size | | sets the size of the buffer |
| conditional branch | delay for successful branch | delay for failure, size | a conditional branch was encountered |
| branch | delay | size | a branch was encountered |

Timing analyzer 603 generates timing and size information 315 for each block and inserts 'C'-code into the original user 'C' program 303 at each block to indicate how much delay occurs in such a block. To do this, timing analyzer 603 allocates an array of a size at least equal to the known number of blocks (the largest increment of the block counter). Each array location is used to store the delay for that block. Those in the art will appreciate that other structures may be used to store the timing results for each block.

Timing analyzer 603 examines all the tokens arriving from the assembly parser 400. Each time the timing analyzer gets a token, it knows from the type of token how many numbers or strings to obtain from pipe 605 for that token. As timing analyzer 603 encounters tokens with delay, it adds up the delays on the fly for each block until the end of the block. Timing analyzer 603 also maintains a block number counter that indexes the array location.

Whenever an amend token is encountered for a block, timing analyzer 603 adjusts the accumulated delay accordingly. Thus, when the assembly parser first sets up the pipeline simulation buffer 609, it sends a set buffer token to the timing analyzer, and the timing analyzer then sets up an analyzer buffer of at least the same size for determining how to make timing amendments. If the amend token refers to an instruction which is in a previous block, the analyzer goes back to the previous block (array element) and changes the number (i.e., the accumulated delay) in the previous block location of the delay array element.

Block boundaries are obtained from the labels. There are two types of labels in the assembly code, the ones the first parser 305 inserted as block information, and labels that the assembler has put in. The timing analyzer ignores assembler labels. Those that we put in include an identifier, in this case the "X_" that the labels commence with. Such labels enable the timing analyzer to know where in the user program any assembly code is.

Adjustments to time delays are made depending on the type of block encountered because different parts in a linear block may execute a different number of times.

Consider, for example, a while loop:

asm ("X_wbn_1");
while (wexpression)
{
  asm ("X_wpn_1");
  wbody
}
asm ("X_wen_2");

Suppose wexpression is true N times during execution so that wbody executes N times. During execution, the delay of wexpression between X_wbn_1 and X_wpn_1, occurs N+1 times, with the last time wexpression executes leading to a false result. The delay inside the loop between X_wpn_1 and X_wen_2 occurs N times. Hence, when the timing analyzer 603 obtains the delays for each block via the pipe 605, it adjusts the delay of the block following the while structure by adding to it the delay of the block between x_wbn_1 and X_wpn_1. The adjustment is made to the delay array at the appropriate locations (which are indicated for example by the n_1 and n_2 parts of the labels). During execution of the analyzed code, the correct total delay will then be provided.

Other loops are similarly identified and the time delay entries appropriately adjusted by timing analyzer 603.

The preferred embodiment includes a provision for optimization. Typically, running the cross compiler with the optimizer invoked may move some of the labels, may cause some other code to be shared, and may cause linear code segments to execute a different number of times in some loops. Consider again a while loop example:

while (wexpression)
{
  wbody
}

With no optimization, the assembly language for this while statement might look like:

X_wb1:
wexpression
conditional branch to $40
branch to exit the loop
$40:
X_wp1:
wbody
X_weM:

where M is a number greater than 1. In the optimized case, on the other hand, the assembly language code might look like X_wb1:
wexpression
conditional branch to exit the loop
X_wp1:
LOOP body
wcondition
condtional branch back to LOOP
X_weM where again, M>1. As can be seen, even though the labels are in proper order, the interpretation of the code is quite different from the non-optimized case.

Thus, when the optimization flag is invoked by running the VPMA process with an optimization flag invoked, the interpretation of the tokens takes into account knowledge of how the compiler optimization may shift some of the labels and/or code in some of the blocks, and also, how the blocks within language structures are to be interpreted.

Note that the preferred embodiment timing analyzer 603 also stores the size in bytes of each linear code element. The size too is stored in an array.

The result of the timing analysis is timing and size information 315 in the form of two arrays, one with the delay time for each block and the other with the size of each block.

Referring again to FIG. 3A, Analyzer 300 now re-parses the user 'C' program file 303 in a second user program parsing step 317. During the parsing, step 317 inserts:

a set of static arrays to include the timing and the size of each block;

'C' statements in each block to increment a global delay counter for that block;

calls for those aspects of timing that cannot be determined until runtime. For example, code to call a bus access simulator or bus access and memory access simulator at runtime are inserted, and code to trap any execution exceptions such as arithmetic exceptions also may be inserted. Exceptions are discussed in more detail herein below; and statements to make sure that line numbering is maintained, and that when the program is run under debugger control, the debugger will ignore the added statements.

Note that the original line statements are maintained even though new code is inserted.

The results of the second merge is the analyzed user 'C' program file 319.

Exception Handling

One aspect of the analysis is determining the possibility of exceptions that occur during execution of the user program. Certain combinations of instructions are known to be able to produce exceptions (arithmetic overflows, divide by zero, etc.) during execution. When such an exception occurs during execution, the pipeline typically needs to be flushed, so a time penalty is introduced. In the preferred embodiment, during analysis, at user option, the analyzer examines instruction combinations for the possibility of exception. When such a combination is identified, the analyzer in the merge step inserts code at the identified locations that, when execute, evaluates exceptions, and when such exceptions occur, trap the processor simulator into an exception handling function that determines the timing penalty for the exception.

Sample Merged Code

The following commented excerpts from an actual 'C' code of an analyzed user 'C' program file demonstrate by way of example, some of the code that is inserted.

/****
  the global variable _VPAgdy is the global delay variable. It is global to allow modules to be linked together.
****/
extern unsigned long long _VPAgdy;
/****
  Delay Time of the blocks in this code is in a local array _VPAtab0. There are four blocks in the particular code, and the delay times as determined by static analysis are 14, 23, 7, and 11 cycles, respectively
****/
static long __VPAtab0[4]={14, 23, 7, 11};
/****
Size of the blocks in this code is in a local array __VPAsz0. There are four blocks in the particular code, and the sizes as determined by static analysis are 56, 52, 28, and 84, respectively.
****/
static long __VPAsz0[4]={56, 52, 28, 84};
Accumulated sizes of the functions up to each block boundary and starting with 0 at the start of a new function is in an array __VPAfacc0. There are two functions in this code.
****/
static long __VPAfacc0[4]={0, 56, 108, 0};
. . .
/****
the following indicates we are at line 1 of the program fact16
****/
line 1 "fact16.c".
short
fac1(unsigned short n)
{
/****
the following indicates we are at line 4. Code is now inserted. A "dumy" name VPA__nf is used so that the debugger (Gnu's GDB), when it encounters the name VPA__nf, is prevented from stopping at any instruction (which are inserted instructions) until a proper name (e.g., back to fact16.c) is encountered
****/
line 4 "VPA__nf"
/****
the following inserted code is calls a bus simulator that performs one bus access using some function vast__BusAccess (that accesses the hardware)
****/
if (vast__BusModelOn){__VPAgdy+=vast__BusAccess( );
}
. . .
/****
the following inserted code Increments the global delay counter for the first block.
****/
__VPAgdy+=__VPAtab0[0];
{
/****
the following indicates we are back in program fact16 at the same line number as when we last inserted code
****/
line 4 "fact16.c"
unsigned short result=1;
unsigned short i;
line 6 "fact16.c"
/****
the following indicates we are at line 8 and. About to insert code.
****/
line 8 "VPA__nf"
// More code that checks for exceptions
<some exception handling code>
/****
end of inserted code. Still at line 8.
****/
line 8 "fact16.c"
. . .
for ( . . . ) {
/****
the first block boundary. Now entering second block so add to global delay.
****/
line 10 "VPA__nf"
__VpAgdy+=__VPAtab0[1];
{
/****
end of inserted code. Still at line 10.
****/
line 10 "fact16.c"
result *=i;
}
/****
the first block boundary. Now entering second block so add to global delay.
****/
line 12 "VPA__nf"
}
__VPAgdy+=__VPAtab0[2];
/****
end of inserted code. Still at line 12.
****/
line 12 "fact16.c"

Thus, in accordance with the preferred embodiment, the analysis process produces an analyzed version of the user program that includes instructions for accumulating the calculated linear block time. While the preferred embodiment analysis process inserts labels as a mechanism to identify block boundaries, other identifying mechanisms may be used. Also, while the preferred embodiment analyzed user program includes inserted instructions that include inserted labels to identify block boundaries, and timing information in the form of data structures indicating the amount of delay per block, other implementations are possible, and such other implementations are included in the scope of the invention.

In accordance with one alternate implementation, the analyzed version of the user program again includes instructions for accumulating the calculated linear block time, however, in this alternate, function calls are inserted at block boundaries rather than labels. There functions are executed at run time. The analysis process inserts code in these functions to accumulate the delay during execution. The functions for each block may include a start-up function that determined any startup penalty due to need to re-fill the pipeline, for example in some cases where the block had started from a branch.

In accordance with another alternate implementation, the analysis process produces a parallel structure that keeps track of the different programming structures within the user program and the block boundaries. Thus, the analyzed version of the user program includes the user program and the parallel structure that mimics the user program structure.

Other alternatives would be apparent to those of ordinary skill in the art from the details provided herein.

Selecting the Level of Detail

One additional aspect of the invention is providing for simulating a processor at a user selected level of detail. Thus where greater timing accuracy is required or desired than provided by running the user program completely on the host computer system, those aspects of the target processor's execution where greater accuracy is required may be modeled in hardware. Such hardware is then included in the digital circuitry simulated by the hardware simulator. For example, the processor bus, or the processor bus and the processor memory may be modeled as hardware in the language of the hardware simulator to model bus accesses or bus/memory accesses.

When faster execution time is desired, the user may select simulating a processor operation without taking into account pipeline effects such as pipeline hazards. In that case, if the processor is one that includes a pipeline, the instruction timing assumes a full pipeline, and if the processor does not include a pipeline, than the instruction timing is the raw instruction timing. Selecting to so simulate and simulating a processor without taking pipeline effects into account is clearly also within the scope.

When modeling one or more aspects of the target processor's execution in hardware using the hardware simulator, a user may further select the level of modeling accuracy. Using the bus or bus/memory access as an example, the way to design a rapidly execution simulation for this is to allow the processor simulator to simulate the function, calculating the timing using time delays determined during the analysis of the user program. As an alternate, during the analysis process, one inserts code that would carry out the required simulation process during execution, into the user program. The inserted code may include code for determining the time delay, which in turn may include calls to the hardware simulator during execution. The inserted code may additionally include returning a value other than the time delay to the user program. Using the bus or bus/memory access examples again, the inserted code may return during execution a pre-calculated value of the delay involved in a bus access or a combined memory and bus access. It also may return the contents of the memory accessed.

Using the bus or bus/memory access example, as a first alternate, consider execution of the analyzed code on the processor simulator. When the processor simulator encounters the inserted code, the inserted code executes and causes the system (using the interface mechanism) to access and start a bus model, or a bus and memory model, in the hardware simulator. This includes causing suspension of execution of the (user program) task. Once the hardware simulator completes the bus or bus/memory access, it stops and returns to the executing inserted code whose execution also is resumed upon receipt of data. Thus the user program continues its operation. Note that no data was transferred on the bus model. The processor simulator resumed after an accurate bus access simulation time had passed. The hardware simulation was accurate for timing purposes, but the data was transferred on the host computer system.

As a second alternative, consider the case that the inserted code accesses an accurate hardware model of the bus that simulates the actual transfer of data, and an accurate hardware model of the memory that stores actual data. In this case, when the processor simulator encounters the inserted code, the code causes the system (using the interface mechanism) to access and start the bus model, or the bus and memory model in the hardware simulator, causing suspension of the code on the processor simulator. The hardware simulator now carries out the bus or bus/memory access including transferring data, and returns the result to the processor simulator that resumes executing the inserted code upon receipt of data and passes information to the user program.

As a third alternate, consider the case that the inserted code when executing returns the time for a bus access or bus/memory access without causing execution of a bus or bus/memory model on the hardware simulator.

Clearly the third alternative executes faster than the first alternative, and the first alternative executes faster than the second alternative. One the other hand, each alternative provides a different level of timing accuracy. One aspect of the invention is providing a user selected level of detail in the processor simulator.

Note that in practice, the first alternative would generally be preferred to the second alternative. That is, the preferred mechanism for adding timing accuracy to an operating aspect of the target processor is to include at a user's option code in the user program that accesses during execution time a timing model of the operating aspect that operates in the hardware simulator, while running corresponding a functional model of the operating aspect on the processor simulator. The purpose of the timing model is to provide accurate timing, while the function is carried out in the processor simulator.

Thus a user can start out with a simple processor model to start off the design process. At some stage of the design process, the user may need to go to more detail in one or another aspects of the design, and the user selected level of detail feature of the invention provides for that. Thus, the processor model can operate at a selected level of detail. Selected parts of the model can be modeled as hardware.

Note that the code inserted during analysis for modeling in more detail can call software modules of the processor model that include the appropriate interface functions (getvars, putvars, etc.) to access the hardware modules of the processor model. Calls to these software modules are thus inserted during analysis. Thus, a bus model for inclusion may include a software component and a hardware model of the bus, with the software component including the necessary code to access the hardware during execution.

The Virtual Processor Model

We call the model of the target processor that runs on the co-simulation design system a virtual processor model. One aspect of the invention is a method for creating such a virtual processor model, the method comprising creating a processor model shell for operation on the hardware simulator of the design system to simulating activity of one or more signals of the target processor accessible to digital circuitry external to the target processor, creating a software shell to provide the user program access to the processor signals coupled to the digital circuitry in the electronic system, and creating target processor specific information for use in analyzing a user program to determine user program timing information such that when the user program is run on a processor simulator operating on the host computer system, the processor simulator accurately simulates execution, including providing timing, as if the user program was executing on the target processor, with the timing taking into account instruction timing and pipeline effects.

Analyzing the user program is described in detail above and includes decomposing the user program into linear blocks and determining linear block timing information.

The processor model shell provides the hardware simulator the ability to access in hardware entities that affect variables defined in the user program. For example, the PLI call back mechanism from the hardware simulator that starts a processor simulator or that sends a message to the user program is included in the processor shell. Thus the processor shell includes a mapper from the data format of the hardware simulator to the data format of the processor simulator. When the hardware simulator simulates hardware described in a hardware description language, the processor model shell includes access to code in the hardware description language. For example, the mechanism that relates the hardware variable asynevent to causing the processor simulator to run an asynchronous event handler is part of the processor software shell.

The software shell comprises functions accessible to a higher-level language code when the user program includes instructions in such a language. The software shell thus includes the translator of event information from the data format of the processor simulator to the data format of the hardware simulator. In the particular embodiment, the software shell includes the interface functions described herein above that provide the user program access to the hardware simulator.

Note that in some embodiments, the hardware simulator simulates hardware using a higher-level language, and in such a case, the processor model shell provides access to instructions in the higher-level language.

When the analysis of user code includes cross compiling the user code, the target processor specific information includes information on how to parse cross compiled target code to determine the time delay for each line in each section of the target code corresponding to each linear block in the user program. The target processor specific information thus including the instruction timing information and the pipeline characteristics of the target processor.

The level of detail of any processor model is user selectable. Thus, different features of the target processor may be selected for modeling in hardware on the hardware simulator as a processor model or as a combination of hardware on the hardware simulator and software on the processor simulator, that is, as a processor hardware model and a processor software model. Analysis of the user code then includes inserting code into the user program to access such hardware modeled features or combines software/hardware modeled features. During execution, these hardware features are modeled on the hardware simulator.

The level of detail in a processor model can be modified from simulation run to simulation run depending on the needs.

Figure 11:
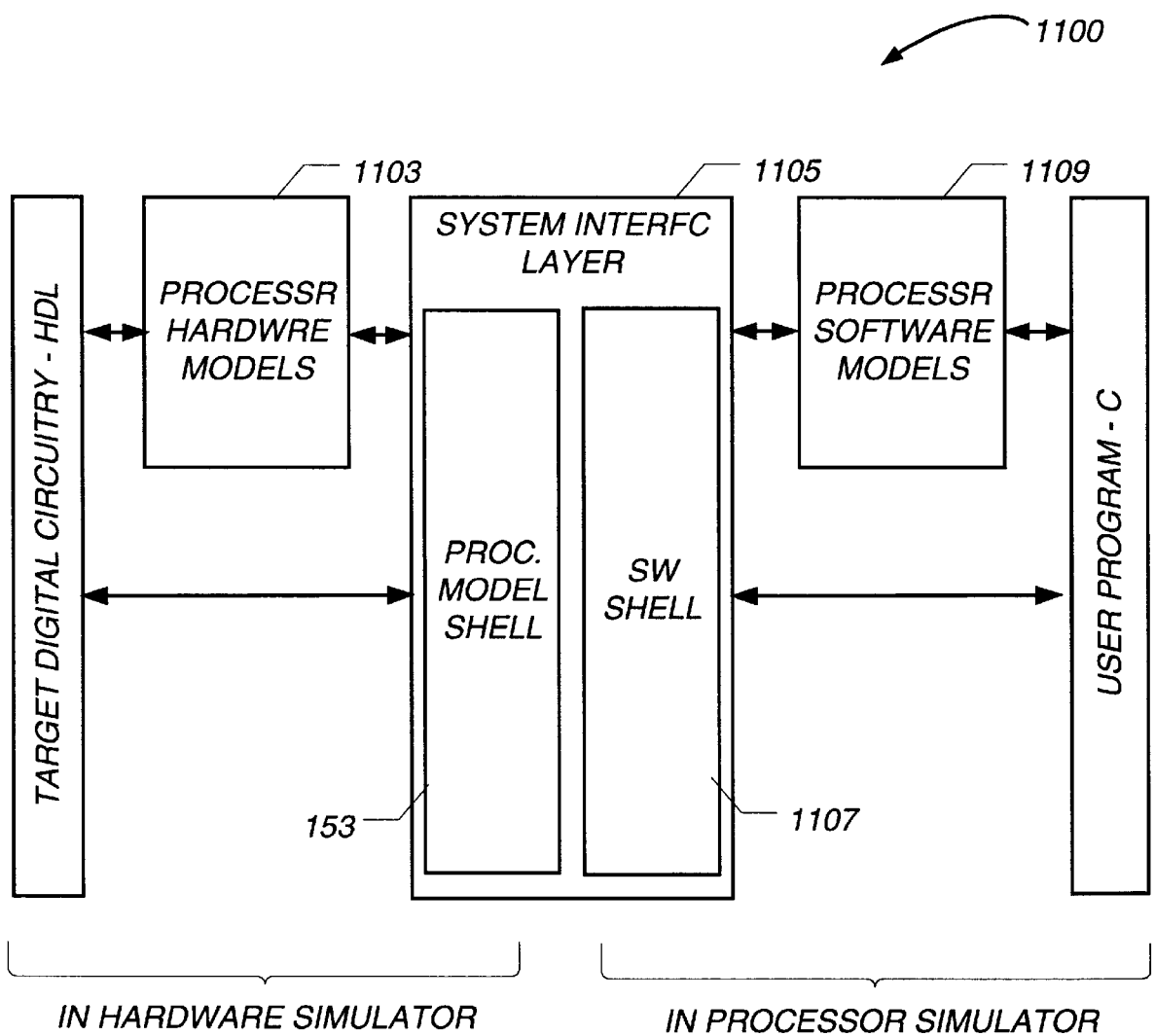
FIG. 11 shows a processor model formed according to an embodiment of the invention.

FIG. 11 shows part 1100 of a virtual processor model in one embodiment in which the hardware simulator simulates digital circuitry specified in an HDL, while the processor simulator simulates execution of a user program written in 'C.' The system interface layer 1105 of the processor model includes the processor model shell 153 and the software model shell 1107. The latter includes both input/output interface functions and other interface functions, for example, interface functions that access hardware simulation time. Processor model part 1100 includes one or more processor hardware models 1103, and one or more processor software models 1109. The reader will appreciate that a typical processor hardware model may operate in conjunction with a processor software model component. For example, to model a bus/memory access, model 1100 may include a hardware bus/memory model that provides timing, and a software model that works together with the hardware model to perform the memory access function, i.e., to access memory contents for the user program. Some processor software models operate without any corresponding processor hardware model. Thus, if a user selects to model a bus access by a fixed time delay, this can be accomplished by a software simulation model.

Therefore, although the present invention has been described in terms of the presently preferred embodiments, it is to be understood that the disclosure is not to be interpreted as limiting. Various alterations and modifications will no doubt become apparent to those of ordinary skill in the art after having read the above disclosure. Accordingly, it is intended that the appended claims be interpreted as covering all alterations and modifications as fall within the true spirit and scope of the invention.

What is claimed is:

1. A co-simulation design system for testing by simulation an electronic system on a host computer system, the electronic system including target digital circuitry, a target processor having a pipeline, and an accompanying user program to be executed on the target processor, the design system comprising:

a processor simulator using software executing on the host computer system for simulating execution of the user program on the target processor, the software including an analyzed version of the user program;

a hardware simulator to simulate the target digital circuitry using software executing on the host computer system; and an interface mechanism that couples the hardware simulator with the processor simulator including controlling communication between the processor simulator and the hardware simulator, wherein the processor simulator includes a mechanism to communicate with the hardware simulator using the interface mechanism when an event requires interaction of the user program with the target digital circuitry, wherein the analyzed version of the user program is obtained by decomposing the user program into linear blocks and calculating the time delay that would be incurred by executing each linear block on the target processor, the time calculating incorporating target processor instruction timing and pipeline effects, such that executing the analyzed version of the user program produces timing information incorporating target processor instruction timing and pipeline effects.

2. The design system of claim 1,
wherein the processor simulator and the hardware simulator process independently of each other.

3. The design system of claim 1,
wherein the processor simulator communication mechanism communicates information associated with the event to the hardware simulator, and
wherein the hardware simulator receives the associated event information.

4. The design system of claim 3,
wherein the hardware simulator processes the associated event information.

5. The design system of claim 4,
wherein the event information includes time delay information indicating an amount of simulated time since a previous event, and
wherein, upon receiving the time delay information, the hardware simulator executes an appropriate amount of hardware simulation time.

6. The design system of claim 5, wherein the time delay information is forwarded to the hardware simulator when no event information has been conveyed to the hardware simulator within a predetermined amount of time.

7. The design system of claim 4, further comprising
a suspend mechanism coupled to the processor simulator that temporarily halts execution of the user program on the processor simulator while the hardware simulator processes the event information.

8. The design system of claim 7, wherein the interface mechanism includes the suspend mechanism.

9. The design system of claim 4,
wherein the hardware simulator processing the event information produces an event result, and,
wherein the hardware simulator includes a mechanism to communicate the event result to the processor simulator using the interface mechanism.

10. The design system of claim 9, wherein the event result is an interrupt, and is processed upon receipt of the event result by the processor simulator.

11. The design system of claim 9, further including
a resumption mechanism coupled to the processor simulator to resume execution of the user program upon receipt of the event result.

12. The design system of claim 9,
wherein the hardware simulator contains a processor model shell to access at least some of the external hardware signals of the target processor connected to the digital circuitry in the electronic system, and
wherein the processor simulator uses a first data format and the hardware simulator uses a second data format,
the design system further including a mapper to map an event result in the second data format to the first data format.

13. The design system of claim 12, wherein the host computer system includes a computer network, wherein the processor simulator is coupled to the translator and the mapper by a first computer network connection of the computer network, the interface mechanism controlling communication between the processor simulator, and the translator and the mapper over the first network connection.

14. The design system of claim 13, wherein the translator and the mapper are coupled to the hardware simulator by a second computer network connection of the computer network, the interface mechanism controlling communication between the translator and the mapper, and the hardware simulator over the first and second network connections.

15. The design system of claim 1,
wherein the host computer system includes a computer network containing a first and a second host computer,
wherein the processor simulator operates on the first host computer,
wherein the hardware simulator operates on the second host computer, and
wherein the processor simulator is coupled to the hardware simulator by a computer network connection of the computer network, and
wherein the interface mechanism controls communications over the network connection.

16. The design system of claim 1, wherein the event requiring the user program to interact with the target digital circuitry is an input/output instruction to the hardware simulator.

17. The design system of claim 1, wherein the processor simulator uses a first data format and the hardware simulator uses a second data format, the system further including a translator to convert the associated event information from the first data format to the second data format.

18. The design system of claim 1,
wherein the user program includes statements in a higher-level language,
wherein decomposing the user program into linear blocks includes parsing the user program to determine linear block boundaries,
wherein calculating the time delay for each linear block comprises:
cross compiling the user program to produce target code;
parsing the cross compiled target code to determine the time delay for each line in each section of the target code corresponding to each linear block in the user program, the time delay determining using characteristics of the target processor; and
calculating the time delay for each linear block of the user program from the time delays determined in the target code parsing step.

19. The design system of claim 18, wherein the analyzed user program includes instructions for accumulating the calculated linear block time delays, and executing the analyzed program includes executing the user program and executing the time delay accumulation instructions.

20. The design system of claim 18, wherein executing the analyzed program includes executing the user program while making reference to the calculated linear block time delays.

21. The design system of claim 1, wherein the hardware simulator operates in a hardware description languages, and at least some of the digital circuitry is specified in the hardware description language.

22. The design system of claim 1, wherein the hardware simulator provides for modeling digital circuitry in a higher-level language and, wherein at least some of the digital circuitry is specified in the higher-level language.

23. The design system of claim 1, wherein the interface mechanism includes a message passing kernel.

24. The design system of claim 23, wherein the processor simulator and the hardware simulators are tasks under the kernel.

25. The design system of claim 23, wherein the host computer system includes a plurality of host processors, and, wherein the processor simulator and the hardware simulators execute on different host processors.

26. A co-simulation design system for testing by simulation an electronic system on a host computer system, the electronic system including target digital circuitry, first and second target processors, and accompanying first and second user programs to be executed on each of the target processors, at least one of the target processors having a pipeline, the design system comprising:
a first processor simulator using software executing on the host computer system for simulating execution of the first user program on the first target processor, the software including an analyzed version of the first user program;
a second processor simulator using software executing on the host computer system for simulating execution of the second user program on the second target processor, the software including an analyzed version of the second user program;
(b) simulating the target digital circuitry on a hardware simulator operating on the host computer system, the simulating of the target digital circuitry including accumulating timing information;
(c) passing communication between the simulated target processor and the hardware simulator at significant events, including events that require interaction between the user program and the target digital circuitry.

27. The design system of claim 26, wherein the first and second processor simulators and the hardware simulator process independently of each other.

28. The design system of claim 26,
wherein the first processor simulator communication mechanism communicates information associated with the first user program event to the hardware simulator,
wherein the second processor simulator communication mechanism communicates information associated with the second user program event to the hardware simulator,
wherein the hardware simulator receives the first user program associated event information, and
wherein the hardware simulator receives the second user program associated event information.

29. The design system of claim 28,
wherein the hardware simulator processes the first user information associated event information, generating a first user program event result, and
wherein the hardware simulator processes the second user information associated event information, generating a second user program event result.

30. The design system of claim 29,
wherein each event information includes time delay information indicating an amount of simulated time since the hardware simulator last received previous event information from the respective user program, and
wherein, upon receiving the time delay information from either of the processor simulators, the hardware simulator executes an appropriate amount of hardware simulation time.

31. The design system of claim 30, wherein the time delay information is forwarded to the hardware simulator from either of the processor simulator when no event information has been conveyed by that processor simulator to the hardware simulator within a predetermined amount of time.

32. The design system of claim 29, wherein the hardware simulator processes the event information producing an event result for information associated with each event, and
wherein the hardware simulator includes a mechanism to communicate the event result to the respective processor simulator whose user program produced the event, using the interface mechanism.

33. The design system of claim 32, wherein one of the event results is an interrupt for a particular target processor, and is processed upon receipt of the event result by one of the processor simulator associated to the event.

34. The design system of claim 32 further including first and second resumption mechanisms respectively coupled to the first and second processor simulators to resume execution of the respective user program upon receipt of the respective user program event result.

35. The design system of claim 26,
wherein the host computer system includes a computer network containing a first and a second host computer,
wherein the processor simulator operates on the first host computer, wherein the hardware simulator operates on the second host computer,
wherein the processor simulator is coupled to the hardware simulator by a computer network connection of the computer network, and
wherein the interface mechanism controls communications over the network connection.

36. The design system of claim 26, further comprising:
first and second suspend mechanisms respectively coupled to the first and second processor simulators, each suspend mechanism temporarily halting execution of the respective user program on the respective processor simulator while the hardware simulator processes the respective user program event information.

37. The design system of claim 36,
wherein the interface mechanism includes the suspend mechanisms.

38. The design system of claim 26,
wherein the host computer system includes a computer network, and,
wherein the first and second processor simulators are each coupled to the hardware simulator by a respective computer network connection of the computer network, the interface mechanism controlling communications over the network connections.

39. The design system of claim 26,
wherein the one of the user program events is an input/output instruction to the hardware simulator, and
wherein the interface mechanism controls communication of the input/output instruction from the event-associated processor simulator to the hardware simulator.

40. The design system of claim 26,
wherein the first and second processor simulators use a first data format and the hardware simulator uses a second data format, the system further including a translator to convert the events when the first or second user program for the first or second target processor, respectively, requires interaction with the target digital circuitry from the first data format to the second data format.

41. The design system of claim 40, wherein the hardware simulator contains first and second processor model shells to simulate activation of the pins of the first and second target processors, respectively, the system further including a mapper to map an event result in the second data format to the first processor data format.

42. The design system of claim 26, wherein the interface mechanism includes a message passing kernel.

43. A method of simulating an electronic system that includes target digital circuitry and a target processor having a pipeline, the method comprising:
(a) simulating executing the user program executing on a target processor by executing an analyzed version of the user program on the host processor, the executing of the analyzed version including accumulating timing information according to the target processor characteristics, the timing information including instruction timing and pipeline effects, information, the block timing information taking into account instruction timing and pipeline effects.

44. The method according to claim 43, wherein the analyzed version of the user program is obtained by an analysis process including decomposing the user program into linear blocks and calculating the time delay that would be incurred by executing each linear block on the target processor, the time calculating incorporating target processor instruction timing and pipeline effects.

45. The method according to claim 44, further including:
(d) modeling one or more aspects of the target processor execution at a user selected level of detail.

46. The method according to claim 45, wherein the analyzing step further comprises:

inserting code into the user program that causes at run time the one or more aspects of the target processor execution to be simulated at the selected level of accuracy.

47. The method according to claim 45, wherein the one or more aspects are modeled in hardware, and wherein the inserted code causes the one or more aspects to be simulated on the hardware simulator.

48. The method according to claim 44, wherein the analyzing step further comprises:

inserting code into the user program for detecting execution exceptions at execution time.

49. The method according to claim 43, wherein one of the significant events is a particular event requiring the user program to interact with the hardware simulator, and wherein the communication is information associated with the particular event, the associated event passed to the hardware simulator.

50. The method according to claim 49, further comprising:

(d) receiving and processing the associated event information at the processor simulator.

51. The method according to claim 50, wherein the associated event information includes time delay information indicating an amount of simulated time since a previous significant event, and wherein said step (d) of processing executes an appropriate amount of hardware simulation time.

52. The method according to claim 51, further comprising:

(e) suspending step (a) of simulating execution of the user program while the associated event information is processed in said step (d).

53. The method according to claim 52, wherein said associated event processing step (d) produces an event result, the method further including:

(f) resuming said execution user program simulating step (a) when the event result is produced.

54. The method according to claim 53, wherein the event result is an asynchronous event, and wherein said resuming step (b) causes simulation of execution of an asynchronous event handler, the handler being part of the user program.

55. The method according to claim 54, wherein the asynchronous event occurs before the processor simulator executes the appropriate amount of hardware simulation time.

56. The method according to claim 55, wherein simulating the handler execution accumulates a handler delay time, the method further comprising examining the user program to ensure that the interrupt handler part of the user program does not share variables with any other part of the user program;

completing processing of the appropriate amount of time on the hardware simulator, processing a further amount of simulation time corresponding to the handler delay time on the hardware processor.

57. The method according to claim 54, further including avoiding the asynchronous event occurring before the processor simulator executes the appropriate amount of hardware simulation time.

58. The method according to claim 51, wherein said associated event processing step (d) produces an event result.

59. A method for creating a processor model for simulating the operation of a target processor executing a user program, the processor model for use in a simulation design system operable on a host computer system to simulate an electronic system that contains target digital circuitry and the target processor, the target processor having a pipeline, the design system including a hardware simulator for simulating the digital circuitry on the host computer system, the method comprising:

(a) creating a processor model shell for operation on the hardware simulator, the processor model shell accessing one or more signals of the target processor accessible to digital circuitry external to the target processor;

(b) creating a software shell to provide the user program access to the processor signals coupled to the digital circuitry in the electronic system; and (c) creating target processor specific information for use in analyzing a user program to determine user program timing information such that when the user program is run on a processor simulator operating on the host computer system, the processor simulator simulates execution, including providing timing, as if the user program was executing on the target processor, the timing taking into account instruction timing and pipeline effects, the user program analyzing including decomposing the user program into linear blocks, determining linear block timing information including the time delays that would be incurred executing each linear block of the user program on the target processor, the block timing information determining using the target processor specific a hardware simulator to simulate the target digital circuitry using software executing on the host computer system; and an interface mechanism that couples the hardware simulator with the first and second processor simulators, including controlling communication between the first and second processor simulators and the hardware simulator, wherein the first processor simulator includes a first mechanism to communicate with the hardware simulator using the interface mechanism when an event requires interaction of the first user program with the target digital circuitry, wherein the second processor simulator includes a second mechanism to communicate with the hardware simulator using the interface mechanism when an event requires interaction of the second user program with the target digital circuitry, wherein the analyzed versions of the each user program are obtained by decomposing the respective user program into linear blocks and calculating the time delay that would be incurred by executing each linear block on the respective target processor, the time calculating incorporating respective target processor's instruction timing and pipeline characteristics, such that executing the analyzed version of the user program produces timing information incorporating the respective target processor instruction timing including any pipeline effects.

60. The method of claim 59, wherein the hardware simulator simulates hardware described in a hardware description language, and wherein the processor model shell comprises an interface in the hardware description language.

61. The method of claim 60, wherein the software shell comprises higher-level computer language code.

62. The method of claim 59, wherein the hardware simulator simulates hardware using a higher-level language, and wherein the processor model shell comprises an interface in the higher-level language.

63. The method of claim 59, wherein the user program includes higher-level computer language code, wherein determining the time delay for each linear block comprises:

cross compiling the user program to produce target code;

parsing the cross compiled target code to determine the time delay for each line in each section of the target code corresponding to each linear block in the user program; and determining the time delay for each linear block of the user program from the time delays determined in the target code parsing step, and wherein the target processor specific information includes information on how to parse cross compiled target code.

64. The method of claim 59, wherein the hardware simulator defines the simulation time frame, and wherein the software shell further provides a user program access to the hardware simulator for the purpose of user program time control.

65. The method of claim 59, further including:

selecting a level of detail of the processor model.

66. The method of claim 65, wherein said selecting a level of detail further includes:

modeling in hardware one or more aspects of the target processor execution where greater accuracy is desired, execution of the one or more aspects simulated by the hardware simulator.

67. The method of claim 65, wherein the user program analyzing further includes inserting code into the user program that simulates at execution time one or more aspects of the target processor execution where greater accuracy is desired.

68. The method of claim 67, wherein inserted code includes code that causes the hardware simulator to simulate at least part of the one or more aspects of the target processor execution.

69. A method of simulating on a host computer system the execution of a user program on a target processor having a pipeline, the target processor being part of an electronic system that includes target digital circuitry, the method comprising:

(a) decomposing the user program into linear blocks;

(b) determining linear block timing information including the time delays that would be incurred executing each linear block of the user program on the target processor, the determining using characteristics of the target processor including instruction timing and pipeline characteristics, the block timing information taking into account instruction timing and pipeline effects;

(c) combining the linear block timing information with the user program;

(d) executing the combined user program and linear block timing information on the host computer system; and (e) simulating the target digital circuitry on a hardware simulator running on the host computer system, wherein execution of the combined user program and linear block timing information on the host computer system includes communicating with the hardware simulator when an event requires interaction of the user program with the target digital circuitry, such that the execution of the combined user program and linear block timing information on the host computer system simulates the execution of the user program on the target processor including providing execution timing that takes into account instruction timing and pipeline effects.

70. The method of claim 69, wherein the user program includes statements in a higher-level language, wherein the step of decomposing the user program into linear blocks includes parsing the user program to determine linear block boundaries, wherein determining the time delay for each linear block comprises:

cross compiling the user program to produce target code;

parsing the cross compiled target code to determine the time delay for each line in each section of the target code corresponding to each linear block in the user program, the time delay determining using characteristics of the target processor; and determining the time delay for each linear block of the user program from the time delays determined in the target code parsing step.

71. The method of claim 70, wherein combining the linear block timing information with the user program produces an analyzed user program that includes instructions for accumulating the timing delay, and wherein the executing executes the analyzed user program on the host processor.

* * * * *

UNITED STATES PATENT AND TRADEMARK OFFICE
CERTIFICATE OF CORRECTION

PATENT NO. : 6,230,114 B1
DATED : May 8, 2001
INVENTOR(S) : Hellestrand et al.

It is certified that error appears in the above-identified patent and that said Letters Patent is hereby corrected as shown below:

Column 39,
Line 33, please change the claim number from "13." to -- 14. --.
Line 33, please change "claim 12," to -- claim 13, --.
Line 40, please change the claim number from "14." to -- 15. --.
Line 40, please change "claim 13," to -- claim 14, --.
Line 46, please change the claim number from "15." to -- 16. --.
Line 59, please change the claim number from "16." to -- 17. --.
Line 63, please change the claim number from "17." to -- 13. --.

Column 40,
Line 29, kindly change "hardware description languages" to -- hardware description language --.

Column 40, line 62 through Column 41, line 3,
Kindly delete and replace with:

--a hardware simulator to simulate the target digital circuitry using software executing on the host computer system; and an interface mechanism that couples the hardware simulator with the first and second processor simulators, including controlling communication between the first and second processor simulators and the hardware simulator, wherein the first processor simulator includes a first mechanism to communicate with the hardware simulator using the interface mechanism when an event requires interaction of the first user program with the target digital circuitry, wherein the second processor simulator includes a second mechanism to communicate with the hardware simulator using the interface mechanism when an event requires interaction of the second user program with the target digital circuitry, wherein the analyzed versions of the each user program are obtained by decomposing the respective user program into linear blocks and calculating the time delay that would be incurred by executing each linear block on the respective target processor, the time calculating incorporating respective target processor's instruction timing and pipeline characteristics, such that executing the analyzed version of the user program produces timing information incorporating the respective target processor instruction timing including any pipeline effects. --

UNITED STATES PATENT AND TRADEMARK OFFICE
CERTIFICATE OF CORRECTION

PATENT NO. : 6,230,114 B1
DATED : May 8, 2001
INVENTOR(S) : Hellestrand et al.

It is certified that error appears in the above-identified patent and that said Letters Patent is hereby corrected as shown below:

Column 42,
Lines 53-55, kindly delete the phrase "information, the block timing information taking into account information taking into account instruction timing and pipline effects." and replace with:
-- (b)      simulating the target digital circuitry on a hardware simulator operating on the host computer system, the simulating of the target digital circuitry including accumulating timing information;
   (c)    passing communication between the simulated target processor and the
        hardware simulator at significant events, including events that require interaction between the user program and the target digital circuitry. --

Column 44,
Line 31, please change "the target processor specific" to -- the target processor specific information, the block timing information taking into account instruction timing and pipeline effects. --
Kindly delete lines 33-59.

Signed and Sealed this

Twenty-second Day of March, 2005

JON W. DUDAS
*Director of the United States Patent and Trademark Office*